(12) United States Patent
Kuchibhotla et al.

(10) Patent No.: US 10,491,689 B2
(45) Date of Patent: Nov. 26, 2019

(54) CENTRALIZED MONITORING OF CLOUD OPERATIONS

(71) Applicant: Oracle International Corporation, Redwood Shores, CA (US)

(72) Inventors: Balasubrahmanyam Kuchibhotla, San Ramon, CA (US); Kamaldeep Singh Khanuja, Pleasanton, CA (US); Bharat S. Paliwal, Fremont, CA (US); Thomas Kurian, Atherton, CA (US); Jimmy Saricos, Mooresville, IN (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 15/387,045

(22) Filed: Dec. 21, 2016

(65) Prior Publication Data

US 2018/0084053 A1 Mar. 22, 2018

Related U.S. Application Data

(60) Provisional application No. 62/395,978, filed on Sep. 16, 2016.

(51) Int. Cl.
*H04L 29/08* (2006.01)
*H04L 12/911* (2013.01)
*H04L 12/24* (2006.01)

(52) U.S. Cl.
CPC .......... *H04L 67/16* (2013.01); *H04L 41/0816* (2013.01); *H04L 47/783* (2013.01);
(Continued)

(58) Field of Classification Search
CPC ...... H04L 67/16; H04L 41/0816; H04L 41/22
(Continued)

(56) References Cited

U.S. PATENT DOCUMENTS

| 8,438,418 B2 | 5/2013 | Ashraff et al. |
| 8,615,584 B2 | 12/2013 | Dawson et al. |

(Continued)

OTHER PUBLICATIONS

Utilizing the Job System and Corrective Actions—Enterprise Manager Cloud Control Job System, https://docs.oracle.com/cd/E24628_01/doc.121/e24473/jobs.htm#EMADM9233, Apr. 11, 2018.
(Continued)

*Primary Examiner* — Wing F Chan
*Assistant Examiner* — Leon Y Tseng
(74) *Attorney, Agent, or Firm* — Invoke

(57) ABSTRACT

In one or more embodiments, a system comprises logic for aggregating and analyzing cloud targets based on a variety of attributes. Responsive at least to receiving a selection of one or more attributes, the system: (a) aggregates, from a plurality of cloud targets, a set of cloud targets that includes a first cloud target supporting at least a first cloud service for a first tenant and a second cloud target supporting at least a second cloud service for a second tenant; (b) presents, through a display interface, the set of cloud targets that includes the first cloud target and the second cloud target; and (c) receiving, through the display interface, a second selection of an action to perform on at least one cloud target in the set of cloud targets. Responsive at least to the second selection, the system performs the action on at least one cloud target.

19 Claims, 29 Drawing Sheets

(52) U.S. Cl.
CPC ........ *H04L 47/826* (2013.01); *H04L 67/1097* (2013.01); *H04L 41/22* (2013.01); *H04L 41/5019* (2013.01); *H04L 41/5054* (2013.01); *H04L 41/5096* (2013.01)

(58) Field of Classification Search
USPC .......................................................... 709/224
See application file for complete search history.

(56) References Cited

U.S. PATENT DOCUMENTS

| | | | |
|---|---|---|---|
| 8,910,278 | B2 | 12/2014 | Davne et al. |
| 8,935,191 | B2 | 1/2015 | Allgaier |
| 9,086,928 | B2 | 7/2015 | Tung et al. |
| 9,170,798 | B2 | 10/2015 | Nagaraja et al. |
| 9,348,646 | B1 | 5/2016 | Daya et al. |
| 9,355,060 | B1 | 5/2016 | Barber et al. |
| 9,590,872 | B1 | 3/2017 | Jagtap et al. |
| 9,612,815 | B1 | 4/2017 | Jagtap et al. |
| 2003/0182245 | A1 | 9/2003 | Seo |
| 2006/0236055 | A1 | 10/2006 | Iitsuka |
| 2012/0078772 | A1 | 3/2012 | Booth |
| 2012/0131176 | A1* | 5/2012 | Ferris ................. G06F 9/5072 709/224 |
| 2012/0137002 | A1 | 5/2012 | Ferris et al. |
| 2012/0179502 | A1 | 7/2012 | Farooq et al. |
| 2013/0111558 | A1* | 5/2013 | Sangubhatla ........... G06F 21/44 726/4 |
| 2013/0198637 | A1 | 8/2013 | Childers et al. |
| 2014/0047099 | A1 | 2/2014 | Flores et al. |
| 2015/0379427 | A1 | 12/2015 | Dirac et al. |
| 2016/0350721 | A1 | 12/2016 | Comerford et al. |
| 2017/0257196 | A1 | 9/2017 | Ghosh et al. |
| 2017/0289093 | A1 | 10/2017 | Snider et al. |
| 2018/0040181 | A1 | 2/2018 | Groeger et al. |

OTHER PUBLICATIONS

Equinox: Adaptive Network Reservation in the Cloud, http://www.cs.cornell.edu/~praveenk/papers/equinox-comsnets-2014.pdf, Apr. 11, 2018.

Creating Custom Actions Using Visualforce, https://developer.salesforce.com/page/Creating_Custom_Actions_Using_Visualforce, Apr. 11, 2018.

Amazon CloudWatch, https://aws.amazon.com/cloudwatch/, Apr. 11, 2018.

Miller, Do You Really Want That Grade "Curved", Jun. 2016, academics.hamilton.edu (3 pages).

* cited by examiner

Fleet Operation Backlog

710 — Summary

712 — Operation Type
- Patching
- Backup

714 — Operation Status
- Failed (3)
- Not Attempted (9)

716 — Tenant
- XYZ
- BB

Save Search | Saved Searches ▼ | View ▼

| Service Name | Service Type | Operation Status | Contact | Operation Type |
|---|---|---|---|---|
| 0001.bb.com | Oracle Cloud Database Service | Failed | bb_admin@bb.com | Backup Database |
| 0002.bb.com | Oracle Cloud Database Service | Failed | bb_admin@bb.com | Backup Database |
| 0003.xyz.com | Oracle Cloud Database Service | Failed | 123_admin@xyz.com | Backup Database |
| 0004.bb.com | Oracle Cloud Database Service | Not Attempted | bb_admin@bb.com | Patch Database |
| 0005.xyz.com | Oracle Cloud Database Service | Not Attempted | 123_admin@xyz.com | Patch Database |
| 0006.xyz.com | Oracle Cloud Database Service | Not Attempted | 123_admin@xyz.com | Patch Database |
| 0007.xyz.com | Oracle Cloud Database Service | Not Attempted | 123_admin@xyz.com | Patch Database |
| 0008.xyz.com | Oracle Cloud Database Service | Not Attempted | 123_admin@xyz.com | Patch Database |
| 0009.xyz.com | Oracle Cloud Database Service | Not Attempted | 123_admin@xyz.com | Patch Database |
| 0010.bb.com | Oracle Cloud Database Service | Not Attempted | bb_admin@bb.com | Patch Database |
| 0011.bb.com | Oracle Cloud Database Service | Not Attempted | bb_admin@bb.com | Patch Database |

Create Patching Fleet Operation

Back  Step 5 of 6  Next  Cancel

General | Operation Properties | Notification | Schedule | Add Service Instances | Review

Create Fleet Operation: Review

General
* Name: ALPHA_ZONE_QUARTERLY_PATCHING
Description: This operation patches databases in the Alpha Zone on a Quarterly basis.

Operation Properties
* Maximum number of databases for parallel processing: 100
* Average processing time for these databases: 0 hours 30 minutes
* Maximum number of databases for the fleet operation: 500
Required number of slots: 3
Projected processing time: 2 hours and 30 minutes
Slot success criteria (%): 95
Inclusion Cut-off Time: 0 days 0 hours 30 minutes before the operation start time
Exclusion Cut-off Time: 0 days 0 hours 20 minutes before the operation start time
☐ Use Queuing Strategy i.e. keep constant parallel processing

Notification & Custom Scripts
Status for Notification
☒ Suspended
☒ Completed, met the Success Criteria
☒ Problems Queuing...

Schedule
Days of the Year: January 20
April 20
July 20
October 20
* Start Time: 2:00:00 AM (UTC-08:00) Los Angeles – Pacific Time (PT)
* End Date and Time: 9/1/16 2:00:00 AM (UTC-08:00) Los Angeles – Pacific Time (PT)

Service Instances

| Target Name | Target Type | Target Status | Contact |
|---|---|---|---|
| 0001.xyz.com | Oracle Cloud Database Service | ⬅ | 123_admin@xyz.com |
| 0002.xyz.com | Oracle Cloud Database Service | ⬅ | 123_admin@xyz.com |
| 0003.xyz.com | Oracle Cloud Database Service | ⬅ | 123_admin@xyz.com |
| 0004.xyz.com | Oracle Cloud Database Service | ⬅ | 123_admin@xyz.com |
| 0005.xyz.com | Oracle Cloud Database Service | ⬅ | 123_admin@xyz.com |
| 0006.xyz.com | Oracle Cloud Database Service | ⬅ | 123_admin@xyz.com |
| 0007.xyz.com | Oracle Cloud Database Service | ⬅ | 123_admin@xyz.com |

Service Operation Status

| Target Name | Target Type | Status | Contact | Elapsed Time |
|---|---|---|---|---|
| ▼ Slot #1 | | In Progress | | 29 minutes, 55 seconds |
| 0001.xyz.com | Oracle Cloud Database Service | Completed | 123_admin@xyz.com | 24 minutes, 22 seconds |
| 0002.xyz.com | Oracle Cloud Database Service | Completed | 123_admin@xyz.com | 29 minutes, 55 seconds |
| 0003.xyz.com | Oracle Cloud Database Service | Completed | 123_admin@xyz.com | 22 minutes, 52 seconds |
| 0004.xyz.com | Oracle Cloud Database Service | Completed | 123_admin@xyz.com | 25 minutes, 25 seconds |
| 0005.xyz.com | Oracle Cloud Database Service | Running | 123_admin@xyz.com | 24 minutes, 22 seconds |
| 0006.xyz.com | Oracle Cloud Database Service | Running | 123_admin@xyz.com | 29 minutes, 55 seconds |
| 0007.xyz.com | Oracle Cloud Database Service | Running | 123_admin@xyz.com | 22 minutes, 52 seconds |
| ▶ Slot #2 | | Yet to Start | | |
| ▶ Slot #3 | | Yet to Start | | |
| ▶ Slot #4 | | Yet to Start | | |

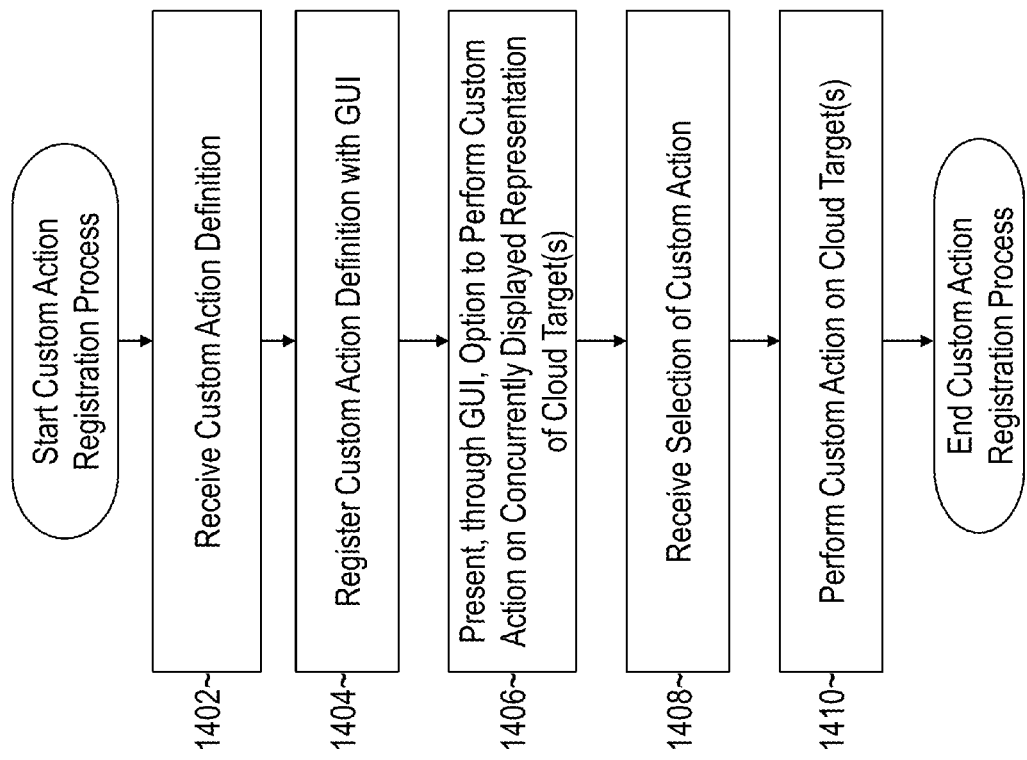

CENTRALIZED MONITORING OF CLOUD OPERATIONS

RELATED CASES; BENEFIT CLAIM

This application claims the benefit of U.S. Provisional Patent Appl. No. 62/395,978, filed Sep. 16, 2016, the entire contents of which are incorporated by reference as if set forth in their entirety.

This application is related to U.S. patent application Ser. No. 15/387028, entitled "CLOUD OPERATION RESERVATION SYSTEM", filed Dec. 21, 2016 and U.S. patent application Ser. No. 15/387060, entitled "SYSTEMS AND METHODOLOGIES FOR DEFINING AND SCHEDULING CUSTOM ACTIONS AS CLOUD OPERATIONS", filed Dec. 21, 2016, the entire contents for each of which are incorporated by reference as if set forth in their entirety.

TECHNICAL FIELD

The present disclosure relates to multi-tenant cloud environments. In particular, the present disclosure relates to computer-implemented systems and methodologies for scheduling, monitoring, defining, and managing operations associated with cloud computing resources and services.

BACKGROUND

Cloud computing involves the use of hardware and software resources to provide services over a network. In most cloud computing models, the responsibility of providing and maintaining the hardware and software infrastructure falls on the cloud service provider. By shifting these responsibilities to the cloud service provider, organizations and other consumers may quickly access and switch between cloud services without incurring the upfront costs of acquiring the supporting infrastructure. Another benefit of cloud computing is that resources may be shared by multiple tenants, which improves scalability and reduces the costs of the underlying infrastructure.

In order to minimize the costs of providing cloud services, cloud administrators are often tasked with managing a relatively large number of cloud service accounts. For example, the cloud administrator may be responsible for ensuring that hardware and software resources contributing to hundreds or even thousands of cloud service accounts are up-to-date and operating properly. If issues within the cloud computing environment are not efficiently detected and addressed, then problems may begin to compound at an accelerated rate. In the worst case scenario, the accumulated problems may result in service disruptions, which are unacceptable to many consumers such as organizations relying on the cloud service to provide other services to paying customers. In addition, if enough problems accumulate, then cloud administrators may not have enough bandwidth to resolve consumer complaints in a reasonable timeframe.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates an example interface for managing operation backlog in accordance with one or more embodiments;

FIG. 8E illustrates an example interface for scheduling instances of a fleet operation in accordance with one or more embodiments;

FIG. 8G illustrates an example interface that provides a summary of a fleet operation

FIG. 9B illustrates an example interface for monitoring active fleet operations in accordance with one or more embodiments;

FIG. 9C illustrates an example interface for providing a detailed report of an active fleet operation in accordance with one or more embodiments;

FIG. 9E illustrates an example interface for providing a history of successful operations in accordance with one or more embodiments;

FIG. 14 illustrates an example set of operations for registering and execution custom action in accordance with one or more embodiments;

DETAILED DESCRIPTION

Figure 1:
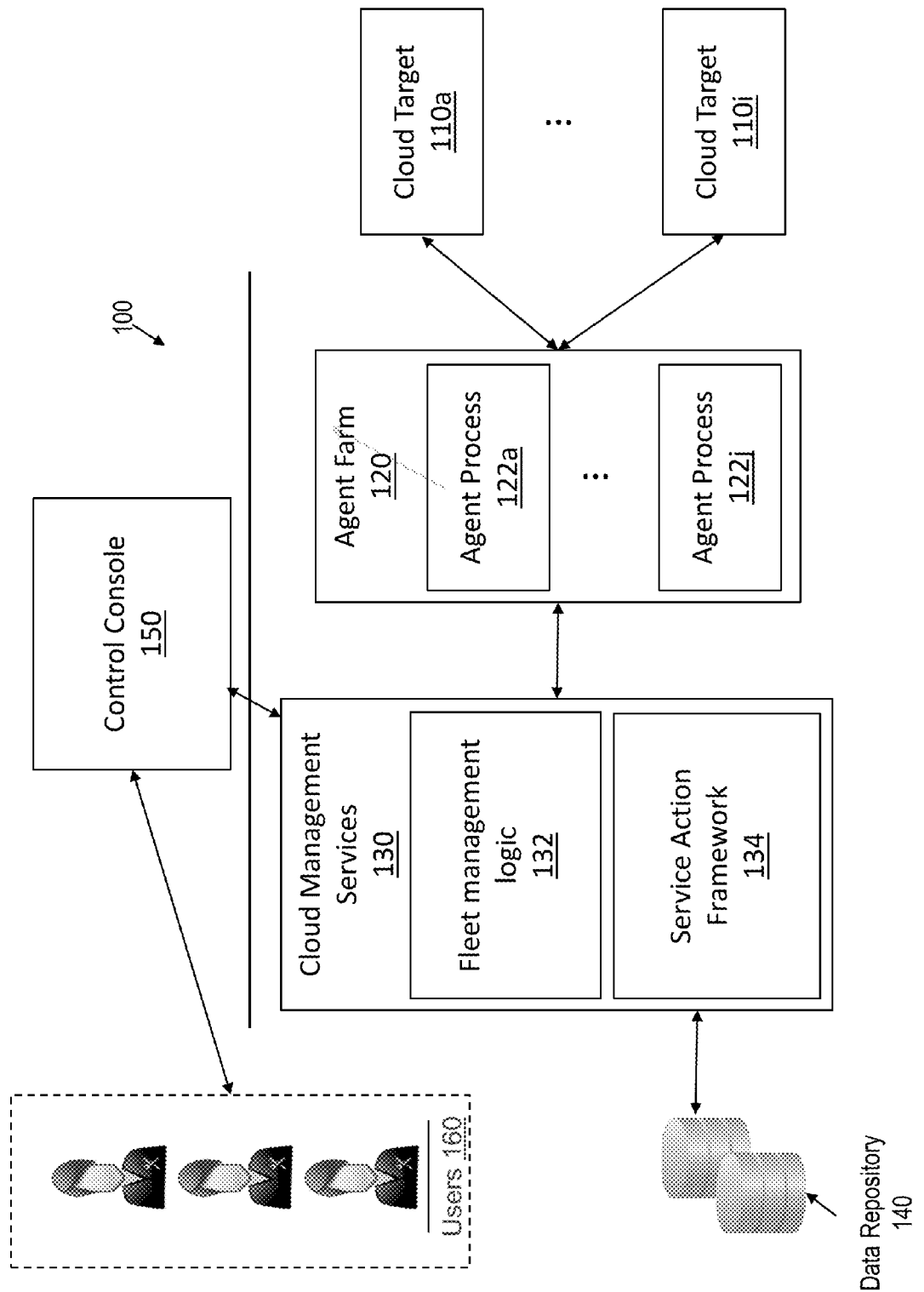
FIG. 1 illustrates a system for managing cloud operations in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. INTER-TENANT RESERVATION SYSTEM
4. TENANT ANONYMITY DURING RESERVATION AND EXECUTION OF CLOUD OPERATIONS
5. CANCELLATION POLICIES
6. STRIKE X POLICIES
7. EXPEDITED SERVICE POLICIES
8. TOPOLOGY-BASED SCHEDULING
9. OPERATION EXECUTION AND ERROR HANDLING
10. OPERATION BACKLOG INTERFACE
11. ADAPTABLE SUCCESS CRITERIA
12. FLEET OPERATION INTERFACE AND MONITORING DASHBOARD
13. SERVICE DASHBOARD AND MONITORING
14. HEAT MAPS
15. SERVICE ACTIONS ON AGGREGATED TARGETS
16. TENANT-SPECIFIC AND CUSTOM ACTIONS
17. HARDWARE OVERVIEW
18. MISCELLANEOUS; EXTENSIONS

1. General Overview

Inefficient management of software and hardware resources within a cloud environment may lead to various problems, including poor resource utilization, performance degradation, and service downtime. For example, a software resource that is managed inefficiently may be neglected and fail to receive updates over times. The longer the software resource is neglected, the farther from a recommended level of configuration it is likely to fall. In some cases, the software resource may be missing critical patches to address security vulnerabilities or other serious issues. These problems negatively impact instances of a cloud service supported by the software resource.

Inefficient management of cloud resources may also unduly burden cloud administrators, making it difficult to address problems in a timely manner. For example, if too many cloud services are scheduled to be updated at the same time and the update fails, the cloud administrator may be left with a relatively large number of remedial actions to perform. As problems begin to compound, the maintenance backlog of the cloud administrator may be ever increasing. As a result, cloud administrators may not have sufficient bandwidth to address the backlog in a timeframe expected by consumers of cloud services.

In multi-tenant cloud environments, cloud administrators are responsible for ensuring the reliable delivery of cloud services to different tenants. Tenants generally expect little to no downtime with cloud services, especially during peak usage hours. In some cases, a tenant may have a service level agreement (SLA) with the cloud service provider that defines the level of service expected by the tenant from the cloud service provider. For example, an SLA may specify the types of service to be provided, the acceptable times for service disruptions, if any, minimal performance requirements of the service, and repercussion to the service provider if the service requirements are not met. Tenants also generally expect to maintain anonymity such that sensitive information is not leaked to other tenants of the multi-tenant cloud platform. If the cloud administrator does not balance management of different tenants effectively, there is a risk that SLAs may be violated and that the cloud services become slow, insecure, or otherwise unreliable.

Systems, stored instruction, and technical steps are described herein for efficiently managing and maintaining resources with a cloud environment. A resource within a cloud environment, also referred to herein as a "cloud target", may be a software application, a hardware device, a cloud service, an operation within the cloud, or any other resource that contributes to a cloud computing platform. With more efficient management of cloud targets, downtime of cloud targets may be minimized and overall performance may be optimized. In addition, the backlog on cloud administrators may be reduced, improving the manageability of cloud targets and decreasing the response time to resolve detected problems.

In one or more embodiments, a cloud operation reservation system is provided through which cloud operations may be scheduled and managed. The cloud operation reservation system includes logic for defining a set of time windows that are available to perform one or more cloud operations on cloud targets and presenting the set of time windows to one or more tenants of a cloud service. Tenants may browse the presented set of time windows and submit reservation requests to update and/or perform other operations on cloud targets. In response to receiving, from a particular tenant, a request to reserve one or more slots in a particular time window, the cloud operation reservation system schedules one or more cloud operations to be performed on a cloud target that is available to the particular tenant. Other tenants may also reserve slots within the same time window to perform operations on other cloud targets that are available to the respective tenants. Barring any intervening events, the at least one operation is executed on the particular cloud target at the scheduled time. Operations on other cloud targets available to the other tenants may also be concurrently executed at the scheduled time.

In one or more embodiments, the reservation capacity of a particular time window is limited to a certain number of slots. The remaining capacity may be presented to tenants such that the tenants are aware of how many slots are available to be reserved. Tenant-identifying information may be omitted to preserve the anonymity of the tenants with respect to each other. With a limited reservation capacity, the cloud reservation system restricts the number of cloud operations that are performed within a given time window. This restriction prevents too many on-demand service requests from overburdening the system and slowing down performance of the cloud operations. In addition, the manageability of the cloud operations is improved as the number of potential failed operations is reduced. As a result, downtime periods may be minimized.

The cloud operation reservation system may further improve manageability and service performance by stopping or delaying operations if too many failed operations are detected. In one or more embodiments, the cloud reservation system defines a plurality of waves for performing a set of scheduled operations on a set of cloud targets within a particular time window, where the plurality of waves includes a first wave for performing scheduled operations on a first subset of cloud target and a second wave for performing scheduled operations on a second subset of cloud targets. During the first wave, a first subset of scheduled operations within the particular time window are performed on two or more target resources from the first subset of target resources. The cloud reservation system then determines a rate of success for performing the first subset of scheduled operations on the two or more target resources from the first subset of target resources. If and only if the rate of success for performing the first subset of scheduled operations satisfies a threshold, then the cloud operation reservation system proceeds to the second wave, where a second subset of scheduled operations within the particular time window are performed on two or more target resources from the second subset of target resources. If the rate of success does not satisfy the threshold, then the cloud operation reservation system delays or cancels operations from subsequent waves including the second subset of operations. In this manner, the amount of failed operations that are permitted within a particular time window is restricted so that the number of problems does not overburden cloud administrators and degrade cloud target performance.

In one or more embodiments, a cloud operation management system provides logic for aggregating and analyzing cloud targets based on a variety of attributes. The cloud operation management system includes logic for receiving a selection specifying at least one attribute for filtering a plurality of cloud targets, and responsive at least to receiving the selection: (a) aggregating, from the plurality of cloud targets, a set of cloud targets that includes a first cloud target supporting at least a first cloud service for a first tenant and a second cloud target supporting at least a second cloud service for a second tenant; (b) presenting, through a display interface, the set of cloud targets that includes the first cloud target supporting at least the first cloud service for the first tenant and the second cloud target supporting at least the second cloud service for the second tenant; and (c) receiving, through the display interface, a second selection of an action to perform on at least one cloud target in the set of cloud targets. The cloud operation management system further includes logic for performing the action on the at least one cloud target in the set of cloud targets responsive at least to receiving the second selection. The cloud operations management system thus allows cloud administrators to quickly aggregate and perform remedial actions and other operations on cloud targets that may support multiple tenants.

In one or more embodiments, custom actions may be registered with the cloud operation management system to provide flexibility and increase the scope of the operations that may be applied to cloud targets. In order to register a custom action, a user provides, to the cloud operation management system, a custom action comprising executable instructions for performing a set of one or more cloud operation. Responsive at least to receiving the definition of the custom action, the cloud operation management system registers the definition with a graphical user interface object. Once registered, the cloud operations management system presents the graphical user interface object concurrently with one or more graphical representations of a set of cloud targets. Responsive at least to receiving, through the graphical user interface object, selection of the custom action, the cloud operations management system performs the set of one or more operations on at least one cloud target in the set of cloud targets.

2. Architectural Overview

A cloud operation management system is provided herein that comprises logic for scheduling, monitoring, defining, and otherwise managing operations within a cloud service platform. A "cloud service platform", as used herein, may include, but is not limited to a set of deployed hardware and/or software resources used to provide a software-as-a-service (SaaS), a database-as-a-service (DBaaS), a platform-as-a-service (PaaS), an infrastructure as a service (IaaS), or any other cloud computing service for one or more tenants. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

In one or more embodiments, the cloud-service platform comprises a multi-tenant architecture where tenants share hardware resources and/or software resources. For example, a multi-tenant instance of an IaaS may allow hundreds or thousands of tenants to share the same set of hardware resources. As another example, a multi-tenant DBaaS may allow multiple tenants to share an instance of a database application, a database schema, and/or another database resource. Similarly, the SaaS layer may support multiple tenants using a single instance of a software application. In some cases, a multi-tenant architecture may provide shared resources at one layer but not at another layer. For example, a cloud service platform may provide a multi-tenant IaaS and PaaS, but only a single tenant DBaaS. As another example, the cloud service platform may provide a multi-tenant DBaaS, but only a single tenant SaaS. Thus, the multi-tenant architecture of the cloud service platform may vary depending on the particular implementation.

A tenant may correspond to a single user or a group of users of a cloud service. A "user" in this context may be a human user or a separate application or service. For example, a tenant may correspond to an enterprise or a department within an enterprise that subscribes to a cloud service on behalf of a group of users that are employed or otherwise associated with an enterprise. As another example, a tenant of a cloud service, such as a DBaaS, may be an application that accesses the cloud service to extend the application's functionality.

Tenants may access one or more cloud services using a set of authentication credentials. The cloud service platform may attach different permissions to different tenants/authentication credentials to preserve tenant anonymity within the cloud. As an example, an identity and access management (IAM) policy may define what actions are allowed by a tenant, what resources the tenant is allowed to access, and the effects of a tenant's request to access a resource. If the tenant attempts to perform an unauthorized action and/or attempts to access an unauthorized resource, the request is denied. The policies may be defined to prevent a tenant from knowing what other tenants are accessing cloud targets within the multi-tenant cloud platform.

FIG. 1 depicts an example system 100 for managing cloud operations in accordance with one or more embodiments. System 100 generally comprises cloud targets 110a to 110i, agent farm 120, cloud management services 130, data repository 140, and control console 150. Components of system 100 may be implemented in one or more datacenters, one or more cloud service platforms, and/or one or more other networked environments.

Cloud targets 110a to 110i represent software resources, hardware resources, cloud operations, and/or instances of a cloud service, or any other resource that contributes to a cloud services platform. Cloud targets 110a to 110i may be deployed within a public cloud environment and/or a private cloud environment, depending on the particular implementation. As an example, a SaaS application may be installed locally within a private enterprise network that belongs to a tenant. The SaaS application may be connected to a public cloud environment to receive updates as they are released by the SaaS provider. Alternatively, the SaaS application may reside on a network host within a public cloud. The tenant may access the SaaS application using a web browser or some other application.

Agent farm 120 comprises a set of one or more agent processes 122a to 122j, with each agent process monitoring one or more of cloud targets 110a to 110i. An agent process may be executed on a cloud target, on the same host machine as a cloud target, or remotely from the cloud target depending on the particular implementation. An agent process may collect various parameters associated with a cloud target including, but not limited to, information about the operations being executed on or for a cloud target, information about the tenants for which the cloud target is available, information about tenants currently accessing the cloud target, performance metrics (e.g., memory bandwidth, central processing unit (CPU) bandwidth, active sessions, etc.) for the cloud target, and topology information that identifies dependencies between cloud targets Cloud management services 130 provides functionality for managing cloud targets 110a to 110i. Cloud management services 130 generally comprises fleet management logic 132 and service action framework 134. As will be explained in further detail below, fleet management logic 132 provides services for generating, updating, publishing, controlling, and monitoring operations performed on or within cloud targets 110a to 110i. Example fleet management operations may include, but are not limited to:

Defining available time windows for performing batch cloud operations;
Scheduling and executing cloud operations such as patching and backing up cloud targets 110a to 110i;
Monitoring the progress of individual and batch cloud operations;
Handling errors within batch cloud operations according to predefined criteria;
Providing notifications to alert cloud administrators of detected batch failures or other events;
Generating reports based on cloud operation attributes; and
Registering and executing custom actions.

Service action framework 134 provides services for filtering, aggregating, visualizing, and performing actions on cloud targets 110a to 110i. Example service actions available through service action framework 134 may include, but are not limited to:

Generating and displaying dashboard views of cloud services and related infrastructure targets;
Controlling dashboard views based on security privileges;
Filtering and aggregating cloud services based on service attributes and metrics;
Performing pre-defined and custom actions on aggregated cloud services;
Monitoring and generating status reports for pre-defined and custom actions on aggregated cloud services; and
Managing tenant requests to streamline the workflow for cloud administrators.

Data repository 140 comprises volatile and/or non-volatile storage and stores information collected by agent farm 120 and generated by cloud management services 130. Data repository may be implemented as a separate storage server (or set of storage servers) and/or may reside on the same network host that executes one or more of cloud management services 130.

Control console 150 provides an interface through which users 160 may access cloud management services 130. Control console 150 may comprise, without limitation, a graphical user interface (GUI), an application programming interface (API), a command-line interface (CLI), and/or some other interface for interacting with users. The users may submit commands through control console 150 to perform one or more of the management operations described herein. In one or more embodiments, control console 150 includes a frontend interface and a backend interface. The frontend interface is configured to interact with tenants. For example, the frontend interface may receive requests, such as service and reservation requests, from tenants, and may present various displays to the tenants. A backend interface, on the other hand, is configured to interface with administrative users. For instance, the backend interface may interact with a cloud administrator to perform various administrative functions such as defining, publishing, and monitoring available cloud operations.

3. Inter-Tenant Reservation System

In one or more embodiments, system 100 comprises an inter-tenant reservation system that allows multiple tenants to reserve times for performing cloud operations. For example, the inter-tenant reservation system may define and publish a set of time-windows that are available to perform cloud operations. Tenants may browse the published time windows and request to reserve slots within time windows that are convenient. If there are remaining slots available within the time window, the reservation system schedules an operation on one or more cloud targets per the received request. If not, then the reservation system may direct the tenants to other time windows that are available to reserve the requested operation.

Figure 2:
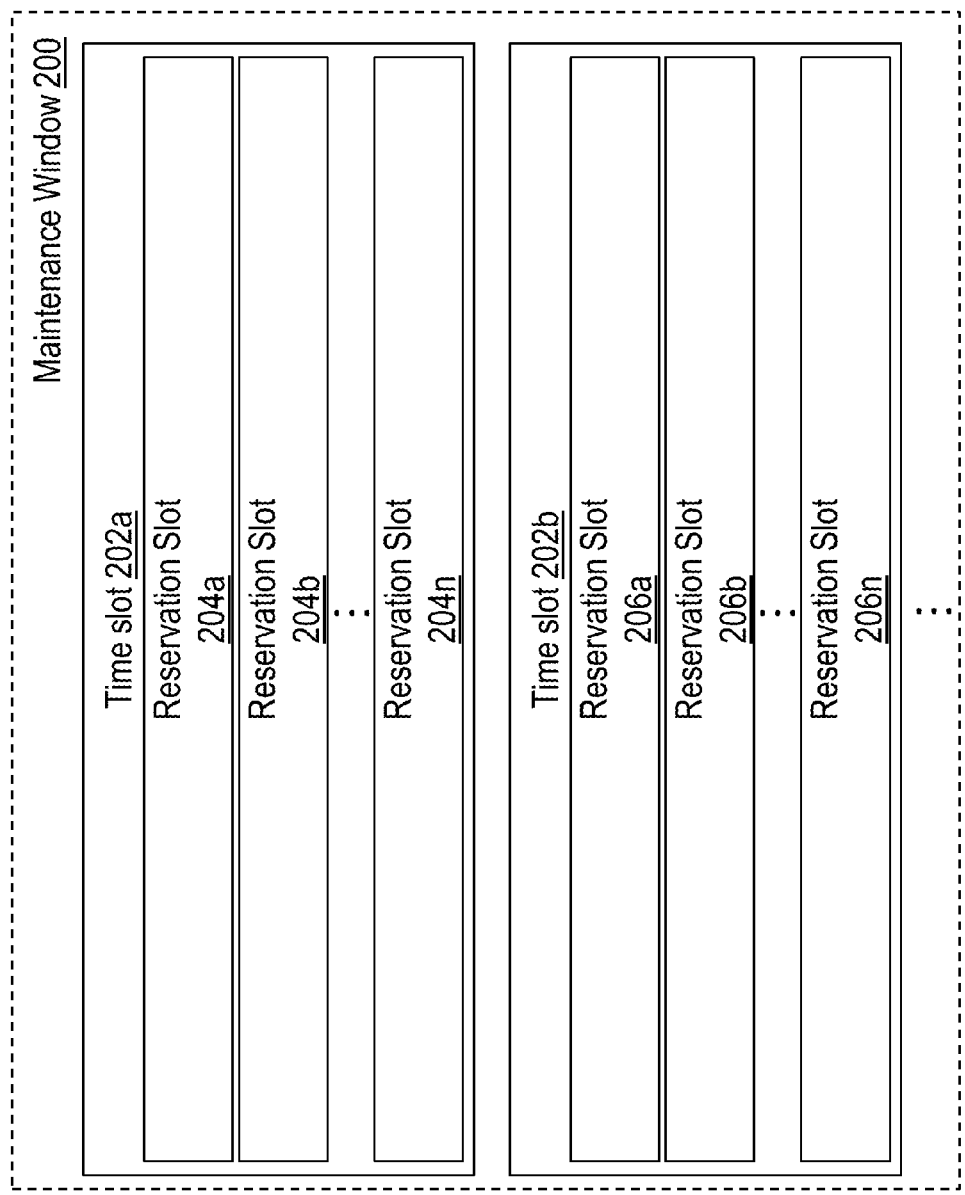
FIG. 2 illustrates an example structure for a published time window in accordance with one or more embodiments.

In one or more embodiments, published time-windows have a limited number of slots to reserve. Referring to FIG. 2, for example, it illustrates an example structure for a published time window in accordance with one or more embodiments. Maintenance window 200 is a time window for performing maintenance operations. Maintenance window 200 includes a plurality of time slots, also referred to herein as waves, including, but not limited to, time slots 202a and 202b. Each time slot comprises a plurality of reservation slots, also referred to herein as sub-slots. For instance, time slot 202a includes reservation slots 204a to 204n, and time slot 202b includes reservation slots 206a to 206n. Different time slots may have the same number of reservation slots or a different number of reservation slots, depending on the particular implementation.

As reservation requests directed to maintenance window 200 are received, the inter-tenant reservation system fills the reservation slots within maintenance window 200. In one or more embodiments, the inter-tenant reservation system automatically assigns cloud targets to a time slot. For example, inter-tenant reservation system may assign cloud targets in a round robin fashion to balance the load between different time slots, may fill up the time slots sequentially, or assign cloud targets to time slots using any other selection criteria. The tenants may or may not be aware of the time slot to which the cloud target was assigned within the maintenance window 200, depending on the implementation. In one or more other embodiments, the tenants may specifically view and request a time slot within maintenance window 200. Once all the reservation slots within a particular time slot have been filled, the inter-tenant reservation system stops reserving operations within the time slot but may keep making reservations within other available time slots within maintenance window 200. If all the reservation slots have been filled across all the time slots, then the inter-tenant reservation system may stop accepting reservation requests and/or deny reservation requests directed to maintenance window 200.

Figure 3:
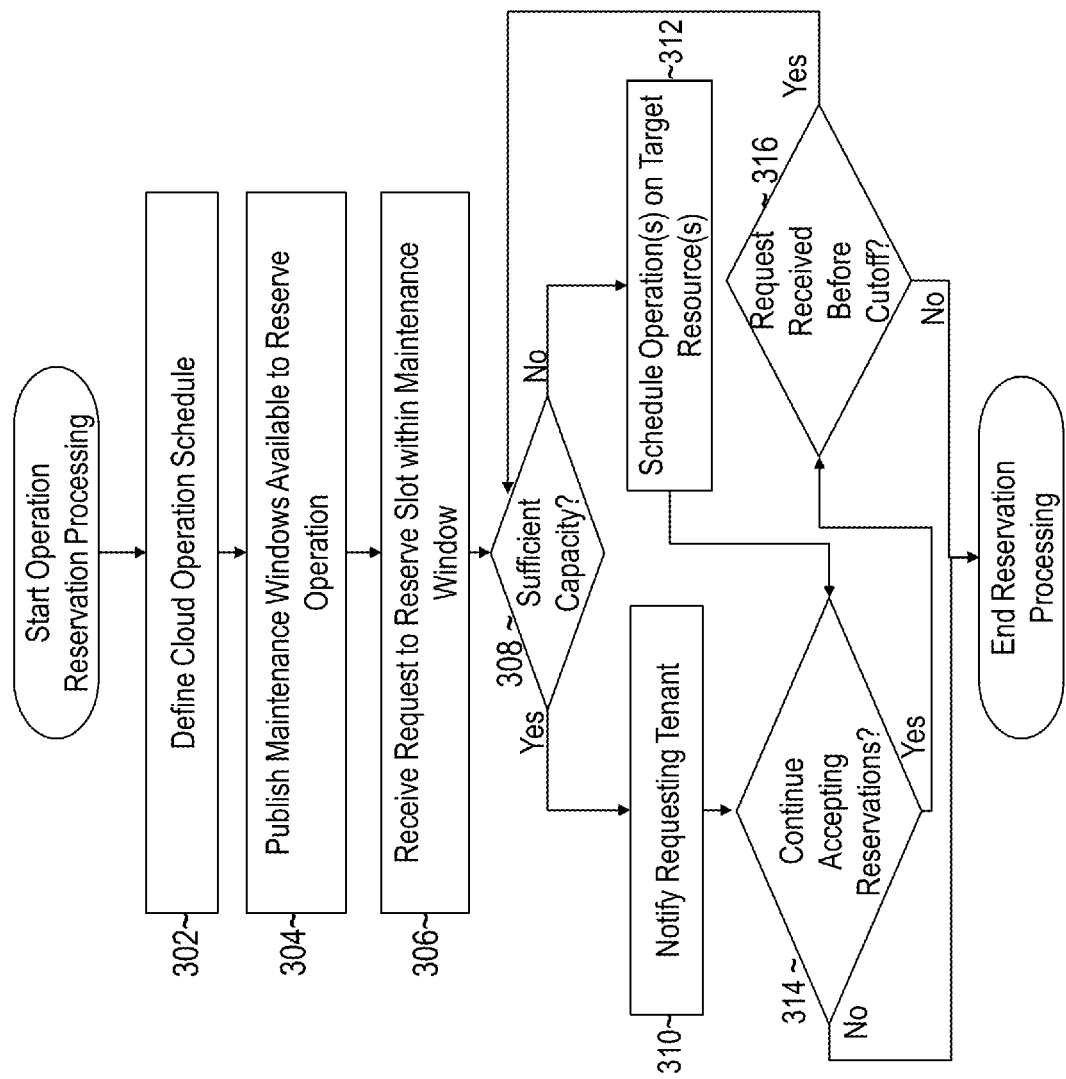
FIG. 3 illustrates an example set of operations for reserving slots available for performing operations on cloud resources in accordance with one or more embodiments.

Referring to FIG. 3, a set of operations for reserving slots available for performing operations on cloud resources is depicted in accordance with one or more embodiments. In the description below, fleet management logic 132 is configured to perform the set of operations. However, in other embodiments any other logic unit or set of logic units may be configured to perform the set of operations in addition to or as an alternative to fleet management logic 132.

Fleet management logic 132 defines a cloud operation schedule for one or more cloud operations (Operation 302). To define a cloud operation schedule, a cloud administrator may interact with fleet management logic 132 through control console 150. For example, control console 150 may present an interface through which the cloud administrator generates or selects a set of one or more cloud operations that are available for reservation. Example operations include, but are not limited to, patching operations, backup operations, configuration operations, custom-defined operations, or other maintenance operations that may be executed on cloud resources. The cloud administrator may then define time windows during which the set of one or more cloud operations are available for reservation. Example interfaces for defining cloud operation schedules are provided in the section titled "EXAMPLE FLEET OPERATION INTERFACE" below.

Once defined, fleet management logic 132 publishes an operation schedule comprising a set of time windows that are available for reserving the cloud operation (Operation 304). Once published, the cloud operation schedule may be individually and concurrently viewed and accessed by multiple tenants.

Figure 4:
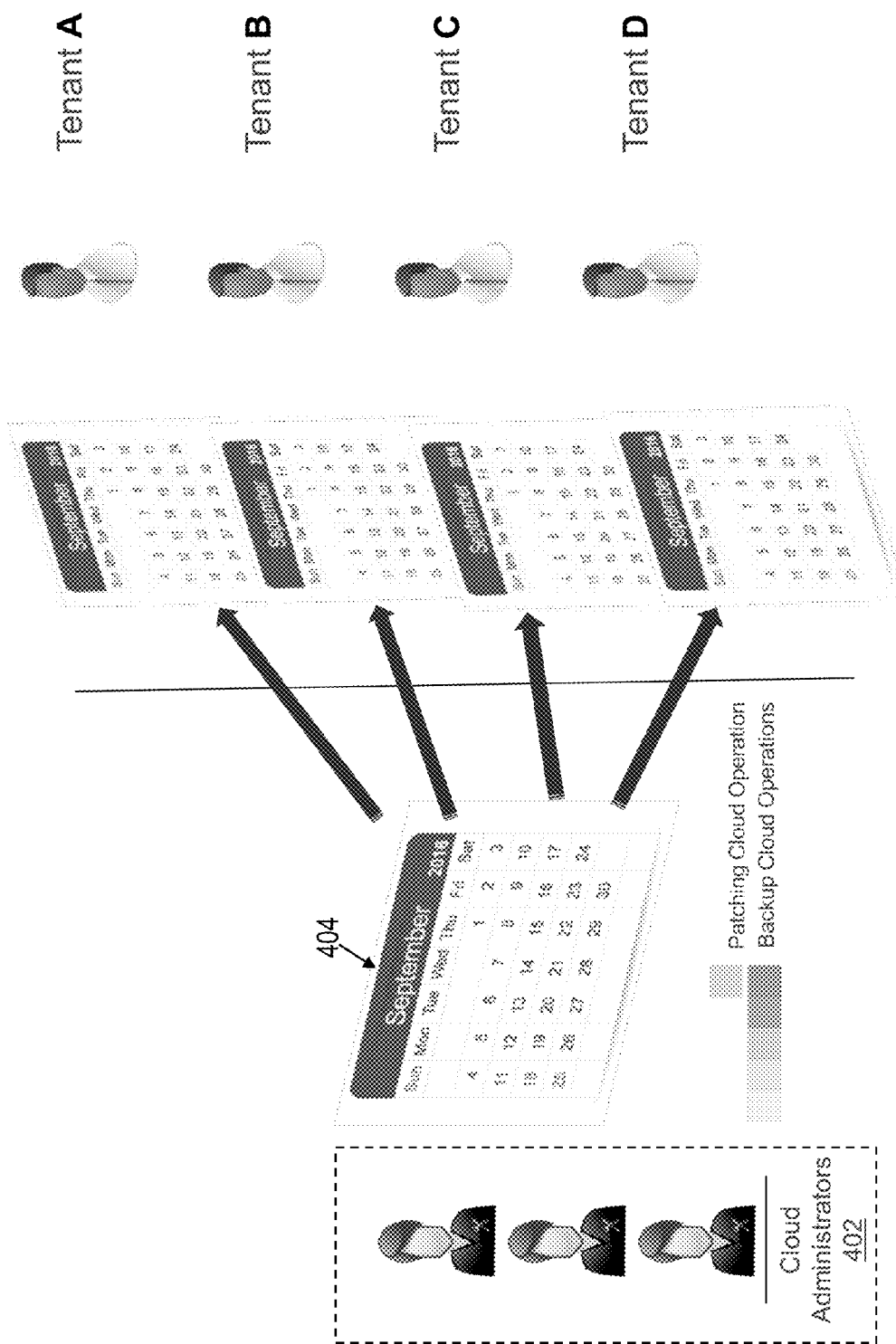
FIG. 4 illustrates an example calendar interface for viewing published cloud operations in accordance with one or more embodiments.

In one or more embodiments, the published cloud operation schedule is provided through a calendar interface. Referring to FIG. 4, for example, an example calendar interface for viewing published cloud operations is illustrated in accordance with one or more embodiments. Cloud administrator 402 may define and edit the operation schedule by accessing calendar interface 404. For example, cloud administrator 402 may define the type or types of operations that are available to be reserved within a set of time windows as well as the number of slots available to be reserved within each time window. In example illustrated, the cloud administrator is defining operations that are available for reservation in the month of September, although published operations may recur over multiple months as described further below. Tenants A, B, C, and D access calendar interface 404 to view scheduled cloud operations that have been published.

In one or more embodiments, calendar interface 404 includes visual indicators to distinguish time windows associated with different types of cloud operations. As an example, calendar interface 404 may color code time windows within calendar interface 404 according to operation type. For instance, patch operations may available for reservation on weekends while backup operations are available during weekday hours. To distinguish the two types of operation, the calendar interface 404 may present tine windows that are available for patching operations using a first color (e.g., red) and time windows available for backup operations using a second color (e.g., green). Similarly, other types of operations that are available for reservation may be presented using different colors. In addition or alternatively, other visual indicators may be used to distinguish between different types of cloud operations. For instance, labels identifying the type (or types) of operation available within a respective time window may be displayed within or adjacent to the respective time window.

Referring again to FIG. 2, fleet management logic 132 receives a request from a tenant to reserve a slot within a published time window. (Operation 306). For example, tenant A may click on or otherwise select a time window displayed within calendar interface 404. Tenant A may then select one or more target resources, available to tenant A, for the operation. Responsive to the selections of tenant A, a reservation request may be generated and submitted to the inter-tenant reservation system. The reservation request may include various parameters, including, but not limited to, data that identifies the selected time window, data that identifies the selected target resources, and/or data that identifies the types of operations to perform on the selected target resources. As an example, if a tenant requests backups operation on a set of database resources, the request may identify the time window selected by the tenant to perform the backup operation, the database resources the tenant has selected for backing up, and the type of operation requested (i.e., a backup operation).

In response to receiving a reservation request, fleet management logic 132 determines whether there is sufficient capacity remaining to service the request (Operation 308). In one or more embodiments, a published time window has a limited number of available slots that may be reserved. Availability thresholds may be pre-defined by a cloud administrator or may be automatically selected, depending on the particular implementation. For example, a cloud administrator may specify that five hundred instances of an update operation may be performed within a given time window (or during a particular wave within a time window as will be discussed further below). Once five hundred target resources have been reserved, fleet management logic 132 may determine that there is no availability left. As another example, availability may be automatically selected based on maintenance backlog, estimated operation execution time, and/or other operation metrics. For instance, if the cloud administrators have a high number of issues to address, fleet management logic 132 may automatically reduce the number of available slots within a scheduled time window. This process helps prevent a potential spike in failed operations to address when there is already a heavy backlog. Once the backlog is reduced, fleet management logic 132 may automatically increase the number of available slots up to a threshold number of slots.

In one or more embodiments, availability information is presented to tenants. For example, calendar interface 404 may display the number of remaining slots for a particular time window being viewed by one or more of tenants A, B, C, or D. As tenants submit requests to reserve slots within the particular time window, the capacity information that is presented to the tenants may be updated in real time. For example, if tenant A and tenant B are concurrently viewing a particular time window for reserving update operations to cloud targets and tenant A submits a reservation request to update five cloud targets, the availability information may be updated to reflect a corresponding reduction in the number of available slots. In other words, the availability information presented to and viewed by tenant B is updated in real-time in response to the reservation made by tenant A.

If there is not sufficient capacity to service a request, then fleet management logic 132 raises an alert to notify the requesting tenant (Operation 310). In one or more embodiments, the notification indicates that there are not enough slots remaining in the time window to perform the requested operation and presents one or more other time windows where there is availability. As one example, the time windows that are presented may be based on proximity to the time window requested. For instance, if the user requested an update operation be performed on Saturday within a time window from 2 a.m. to 4 a.m., and there is another available window from 4 a.m. to 6 a.m. on the same day, this time window may be presented to the tenant as an alternative. In addition or alternatively, the alternative time windows presented to the tenant may selected based on the hours and/or the day of the requested time window. For instance, if the user requested a time widow on Sunday 2:00 p.m. to 500 p.m., and there is availability to perform the operation on the following week at the same time, then this option may be presented to the tenant as an alternative.

In some cases, there may be availability only for a subset of the cloud resources selected by a tenant. For example, if the cloud tenant requests a patching operation to be performed on ten instances of a database application, but there are only five slots available, fleet management logic 132 may present, to the requesting tenant, an option of scheduling a subset of the database applications or moving the reservation for all database applications to a different time window.

If there is remaining capacity, then fleet management logic 132 schedules one or more operations on one or more cloud targets per the tenant's request. (Operation 312) Fleet management logic 132 may store information identifying each of the cloud targets that have been scheduled for a particular time slot. In some cases, target resources that are available to different tenants may be scheduled for the same window of time. For example, fleet management logic 132 may reserve one or more slots to perform update operations on cloud targets available to tenant A. Within the same window of time, fleet management logic 132 may reserve one or more slots to perform update (or other operations) on cloud targets available to one or more of tenants B, C, or D. As discussed further below, fleet management logic 132 maintains anonymity between tenants that have reserved cloud operations through the reservation system.

For each published cloud operation schedule, fleet management logic 132 determines whether to continue monitoring for reservation requests (Operation 314). If there are no more slots available for the scheduled cloud operation, then fleet management logic 132 may stop accepting reservation requests. In other cases, fleet management logic 132 may define a reservation cutoff time. For example, fleet management logic 132 may stop accepting reservation requests within an hour or some other threshold period before a time window.

Fleet management logic 132 continues monitoring for reservation requests until the criteria for stopping monitoring have been satisfied (Operation 316). If additional reservation requests are received, the process returns to operation 308 to process the new reservation request. Otherwise, the reservation processing for the maintenance window ends.

4. Tenant Anonymity During Reservation and Execution of Cloud Operations

In one or more embodiments, the inter-tenant reservation system preserves tenant anonymity. If a tenant reserves a slot within a time window, other tenants may see the number of available slots within the time window change. However, the inter-tenant reservation system does not allow the other tenants to view tenant-identifying information about the other tenants accessing the reservation system. Thus, multiple tenants share the service maintenance reservation system without being aware of which other tenants are accessing the system.

In one or more embodiments, the tenants are prevented from seeing reservation details associated with other tenant requests. For example, a tenant may be prevented from viewing one or more of the following details:

Names, labels, or other identifiers associated with tenants that have reserved a slot;

Information identifying how many tenants have reservations within a time window;

Hostnames, internet protocol (IP) addresses, and other identifiers associated with cloud targets available to other tenants; and/or Information identifying the types of operations reserved by other tenants.

In one or more embodiments, tenant permissions are governed by IAM policies maintained by system 100. When a tenant logs in to access the inter-tenant reservation system, fleet management logic 132 may authenticate the tenant and determine the permissions that are attached to the tenant's authentication credentials. Fleet management logic 132 may then restrict the details that are visible to the tenant based on the tenant's permissions. For example, tenant A may view details within calendar interface 404 about target resources that have been reserved on behalf of tenant A. However, tenant A is prevented from viewing tenant-identifying information for tenant B, C, or D even though one or more of these tenants may have reserved the same slot. Similarly, tenant B may have a different view of calendar interface 404 that identifies reservations made on behalf of tenant B but that omits tenant-identifying information for the other tenants.

5. Cancellation Policies

In one or more embodiments, the inter-tenant reservation system defines cancellation policies with respect to scheduled cloud operations. A cancellation policy in this context prevents tenants from cancelling a scheduled cloud operation within a threshold period of time before execution of the operation. Once the cutoff time for cancelling the scheduled cloud operation has been reached, the inter-tenant reservation system may prevent or deny tenant requests to cancel reservations. Cancellation policies help promote efficient scheduling and execution of cloud operation by preventing too many unfilled slots caused by last-minute cancellations.

To accommodate cancellations when a time-window is fully booked, the inter-tenant reservation system may place cloud targets on standby according to one or more embodiments. For example, once all of the reservation slots have been filled within a time window, fleet management logic 132 may place subsequent requests within a queue. If a cancellation request is received before the cutoff time, fleet management logic 132 removes operations directed to the requesting tenant's cloud targets from the time window. Fleet management logic 132 may then fill the newly opened reservation slots by scheduling operations on cloud targets available to one or more other tenants (e.g., on a first come first serve basis) per the requests pending in the queue. Fleet management logic 132 may send a notification about the cancellation and the newly added cloud targets to each tenant that was taken off of standby.

6. Strike X Policies

As previously mentioned, cloud services that have fallen too far behind a recommended level of configuration may cause various issues, from security problems to suboptimal performance. In order to prevent or mitigate these issues, fleet management 132 may implement a set of one or more policies, referred to herein as a "strike x" policy, to ensure that cloud targets are up-to-date within an acceptable configuration level. If the cloud targets violate the strike x policy, then a forced update is triggered to update the offending targets to an acceptable configuration level.

In one or more embodiments, strike x policies define the acceptable configuration level in terms of a threshold amount of drift that is permissible. For example, the strike x policy may specify that only the last 'x' standard configurations for a cloud service are permitted, where the value 'x' is a positive integer (e.g., 1, 2, 3 etc.) that may be selected by default or defined by a cloud administrator. If a cloud service deviates from the last 'x" standard configurations, then a forced update is scheduled automatically.

If a forced update has been triggered, fleet management logic 132 may send a notification to the tenant associated with the cloud service. The notification may identify the time that the update is scheduled and give the tenant a limited range of time to reschedule the update. For example, fleet management logic 132 may automatically schedule a forced update for Friday at 8 p.m. If this time is inconvenient for the tenant, fleet management logic 132 may allow the tenant to reserve a slot within a different time window up to a week (or some other threshold period) after the automatically selected time. The forced update thus gives some flexibility to the tenant to reschedule the update in the event that the automatically selected time is inconvenient. However, the update is forced within a threshold range of time to prevent the cloud service from falling too far behind the standard level of configuration.

Figure 5:
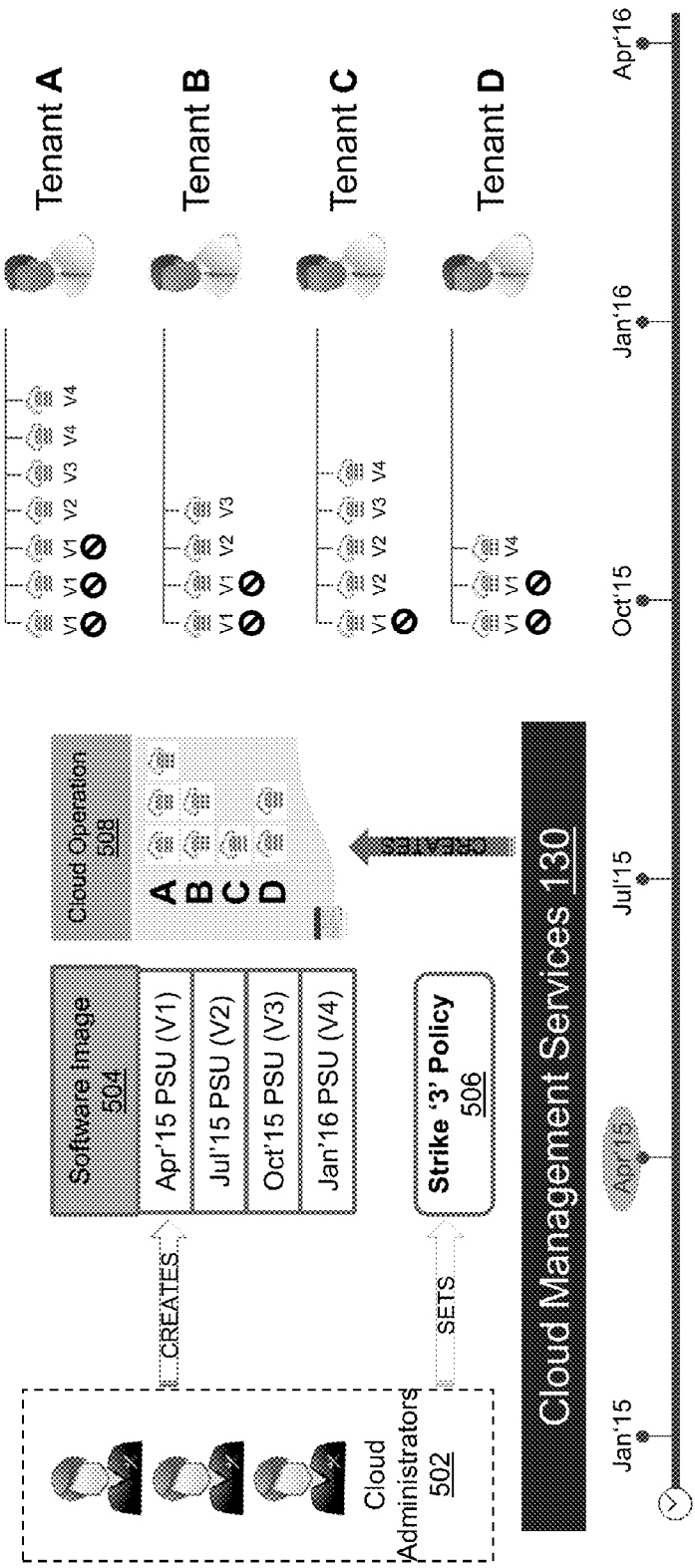
FIG. 5 illustrates an example implementation of a strike x policy in accordance with one or more embodiments.

Referring to FIG. 5, an example implementation of a strike x policy is depicted in accordance with one or more embodiments. Cloud administrators 502 creates updated versions of software image 504 over time including version 1 (V1), version 2 (V2), version 3 (V3), and version 4 (V4). Cloud administrators 502 also define strike policy 506 that allows deployments of the three latest versions of software image 504 within tenant sites (e.g., private clouds). When V4 of software image 504 is released, cloud management services 130 detects that tenant A has three deployments of software image 504 that are still configured according to V1, thereby violating strike policy 506. Tenant A also has four deployments that are configured according to V2 or later, which are among the three latest versions of software image 504 and do not violate strike policy 506. Tenant B and D both have two deployments that violate strike policy 506, and tenant C has one software deployment in violation. Cloud management services 130 detects the violations and schedules cloud operation 508 on each deployment that violates the strike policy 506. Cloud operation 508 to update each of the offending targets to the latest version of software image V4 or any other version that is not in violation of strike policy 406 (e.g., V2, V3).

7. Expedited Service Policies

In some cases, a tenant may not wish to wait until an available time window to perform a maintenance operation. For instance, the tenant may experience performance degradation or some other issue with a cloud service, causing a negative impact on the tenant's own customers. In such cases, the tenant may submit an expedited service request in accordance with one or more embodiments. Responsive to the expedited service request, the inter-tenant reservation system may schedule one or more maintenance operations at the soonest possible time, even if the closest time window is full (i.e., no reservation slots remain).

In one or more embodiments, a set of expedited service policies are maintained that limit the number of expedited service requests that may be made by tenants. For example, a policy may specify that tenants may submit two expedited service policies per year or within some other timeframe. If the tenant exceeds the limit, the expedited service request may be denied. This policy prevents tenants from submitting an unreasonable number of requests creating administrative backlog and degrading the performance of cloud operations for other tenants.

Tenants may be limited to the same number of expedited service requests or the number may vary between different tenants, depending on the particular implementation. For example, high priority tenants, such as those that are associated with a greater number of cloud targets, may be given a greater number of service requests than lower priority tenants. As another example, tenants may be permitted to pay for extra expedited service requests. Thus, the number of expedited service requests granted may vary from implementation to implementation.

8. Topology-Based Scheduling

In one or more embodiments, the inter-tenant reservation takes the topology of cloud targets into consideration when scheduling operations. Accounting for topology may be useful in cases where an operation on one cloud target would affect at least one other cloud target. For example, updating an instance of a database service may cause a software deployment that interacts with the instance of the database service to stop functioning properly. Other cloud operations may similarly negatively affect target resources if topology is not accounted for during the reservation process.

In order to account for topology, agent farm 120 may collect topology metadata that includes information describing dependencies and/or other relationships between cloud targets. For instance, a topology graph may show that one node (corresponding to a target resource) is connected to another node (corresponding to a different target resource), indicating that the two nodes/corresponding target resources have a relationship with each other. If one target resource is "connected to" another target resource in a topology graph, then the two resources are determined to be functionally associated with each other.

In one or more embodiments, the relationship metadata indicates more than just a connection between two nodes such as a functionality and/or a direction associated with that connection. For example, a functionality is present in a relationship of "A runs on B" or "A is stored on B" or "A uses B as a load balancer." A direction may be present in a relationship of "A uses B" or "B uses A, or even "B uses A and A uses B." The topology graph may be traversed to determine which resources are functionally dependent on other resources and/or other relationship information. In the context of an application server, for example, a topology graph may have a node corresponding to the application server connected to several applications, indicating that the server is "connected" to each of the applications. The topology graph may further indicate that each of the applications are functionally dependent on the application server.

If a tenant requests an operation on a particular cloud target, fleet management logic 132 may determine, based on a topology metadata, whether any other cloud targets are affected. For example, in response to a reservation request to update a particular target resource, fleet management logic 132 may parse a topology graph to determine whether any dependencies exist for the target resource. If a dependency is detected, then fleet management logic 132 may determine whether the requested operation will affect the dependent target(s). If the operation will affect the dependent target(s), then fleet management logic 132 may notify the requesting tenant.

In one or more embodiments, fleet management logic 132 may reserve operations on dependent targets within the same time slot or time window as the cloud target that is the subject of a reservation request. As an example, fleet management logic 132 may receive a reservation request to update an instance of a middleware application on Saturday morning. In response, fleet management logic 132 may determine that an instance of an SaaS application is dependent on the instance of the middleware application and will not work without an update. Fleet management logic 132 may notify the tenant and give the tenant the option to add the instance of the SaaS application to the same time window. In this case, two slots are reserved: one for the instance of the SaaS application and one for the instance of the middleware application. In other cases, there may be more than one dependency or no dependencies, depending on the topology of the cloud targets. By scheduling updates within the same time window, this process may prevent incompatibilities between dependent resources from causing downtime or performance degradation.

9. Operation Execution and Error Handling

Once a start time for a time window has been reached, fleet management logic 132 triggers execution of operations scheduled within the window. The operations that are executed may vary depending on the operations reserved by the tenants. For example, tenant A may have reserved an update to an instance of a database application, while tenant B may have reserved an update to an SaaS application within the same time window. As another example, tenant B may have requested an update to a different version of the database application than tenant A. Fleet management logic 132 may determine which operations to perform based on the scheduling information stored for the time window within data repository 150.

In some cases, one or more scheduled executions may fail. The potential causes of an operation failure are varied. Examples may include, but are not limited to, insufficient space on a host device to complete the operation, software defects, incompatible patches, and power outages. Depending on the number of failures detected, cloud administrators may or may not want to halt other operations scheduled within a time window. For instance, if a single update operation scheduled by tenant A fails, there is no reason to halt other operations in the same time window being performed on cloud targets available to other tenants. Halting these operations would inconvenience the other tenants with little or no benefit. On the other hand, if a relatively large number of failures are detected, then there may be multiple reasons to halt other operations within the time window. One reason is to maintain maintenance backlog at a reasonable level. With too many failures, cloud administrators may not be able to resolve all of the problems within a timeframe expected by tenants. Another reason to halt operations is that a large number of failures may be caused by a flaw in the update process and/or the patches that are being applied to the cloud targets. By halting the process, these issues may be addressed at a more global level instead of having to address them for each individual tenant. This allows for quicker resolution of the problem.

If a failed operation is detected, fleet management logic 132 triggers an error handling process according to one or more embodiments. The error handling process that is triggered may depend, at least in part, on how many total failed operations have been detected. If the number or ratio (e.g., percentage) of failed operations does not satisfy a threshold, then fleet management logic 132 may trigger logic for managing the failures by exception. With manage by exception, the operations that have failed are placed into a workload queue, list, or some other data object to be addressed on an individual or group basis by the cloud administrator. Fleet management logic 132 does not halt the other scheduled operations in the time window. Instead, these operations are allowed to proceed as normal even though other operations within the same time window have failed. If fleet management logic 132 detects that the number (or ratio) does not satisfy the threshold, then fleet management logic 132 may trigger logic for halting scheduled operations that are pending. "Pending" in this context may include operations that are in progress and/or operations that have not yet been started.

In one or more embodiments, fleet management logic 132 analyzes failure rates on a wave-by-wave basis. Referring again to FIG. 2, for example, maintenance window 200 includes time slots 202a to 202i, which correspond to different "waves" for executing scheduled operations. Once the start time for maintenance window 200 has been reached, fleet management logic 132 may start by executing operations reserved within the first wave. If the success rate does not satisfy a threshold, then fleet management logic 132 may cancel the operations scheduled in other waves, including those scheduled in time slots 202b and 202i. The operations that are cancelled may include operations scheduled for different tenants on a plurality of different cloud targets. If the success rate satisfies the threshold, then fleet management logic 132 proceeds to the next wave, and the process repeats again. That is, if the success rate in the second wave does not satisfy a threshold, then the subsequent waves may be cancelled (in this case the first wave is not cancelled as it has already completed). Otherwise, the subsequent waves may proceed after operations in the previous wave complete.

Figure 6:
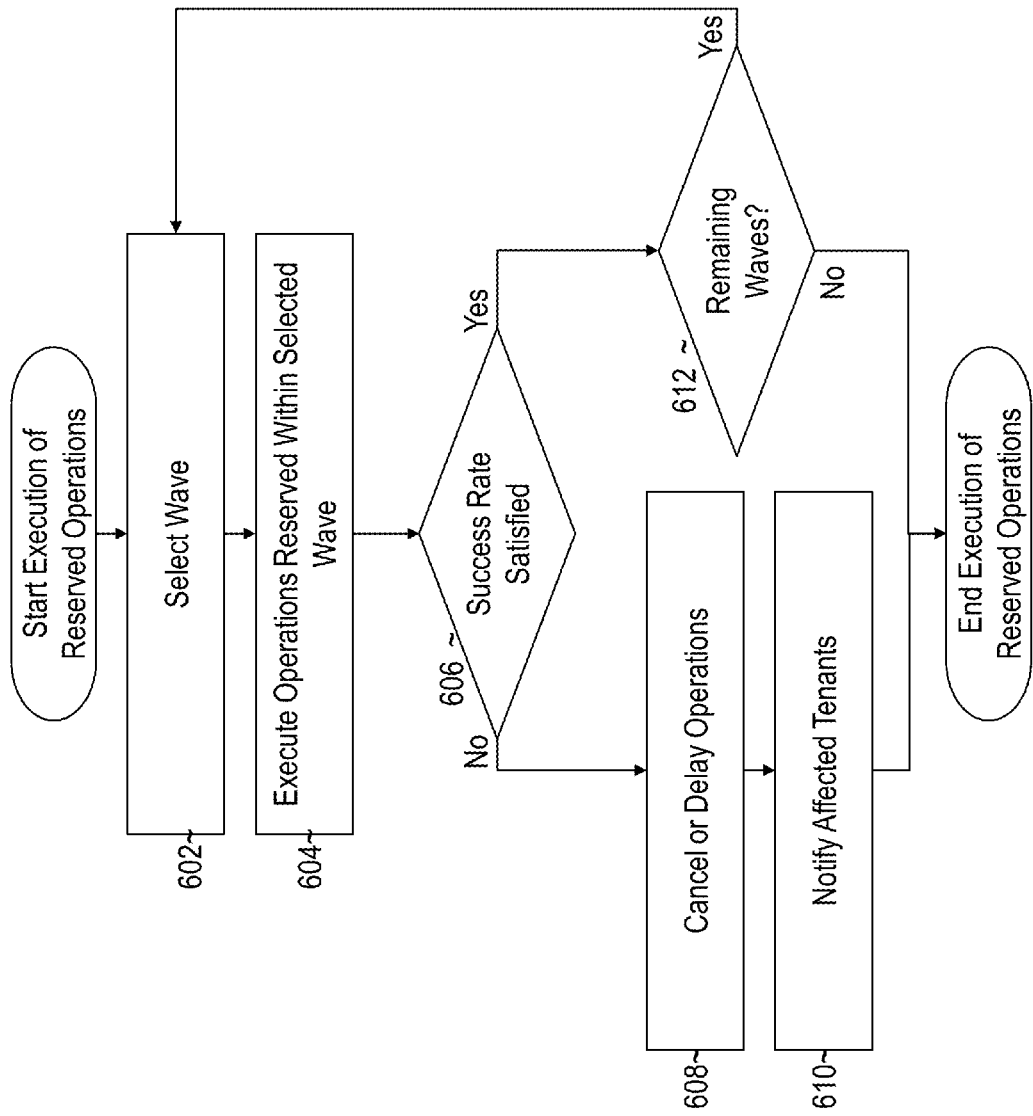
FIG. 6 illustrates an example set of operations for executing scheduled waves of operations in accordance with one or more embodiments.

Referring to FIG. 6, an example set of operations for executing scheduled waves of operations is illustrated in accordance with one or more embodiments. Fleet management logic 132 selects a wave for processing (Operation 602). For example, fleet management logic 132 may select operations scheduled within a first time slot of a time window to begin the process.

Once a wave has been selected, fleet management logic 132 triggers execution of the operations that have been reserved for the wave (Operation 604). In one or more embodiments, fleet management logic 132 assigns operations within the wave to different processes in a pool of processes. The processes may execute the operations in parallel, providing faster execution times and completion of tasks within the wave. In addition or alternatively, two or more of the operations assigned within the wave may be executed sequentially. For example, when a process finishes one operation within a wave, the process may move on to another operation that has not yet been started by a different process.

During and/or after execution, fleet management logic 132 determines whether an operation success rate satisfies a threshold (Operation 606). For example, fleet management logic 132 may update a counter each time a failure within the wave is detected. If the counter exceeds a threshold value, then the wave may be classified as a failure. As another example, fleet management logic 132 may compute a ratio of operations that have completed successfully. If the ratio is less than a threshold value (e.g., a 70% success rate, 80% success rate, or some other threshold), then the wave may be classified as a failure. If an update operation fails, the target may be rolled back to a previous state (e.g., a previous version of a software image).

If the operation success rate does not satisfy the threshold, then fleet management logic 132 cancels or delays operations scheduled in subsequent waves (Operation 608). For example, if the wave corresponding to time slot 202a is classified as a failure, fleet management logic 132 may prevent the operations scheduled for time slot 202b to 202i from being executed. Fleet management logic 132 may automatically reschedule these operations by reserving slots in another available time window. Alternatively, fleet management logic 132 may prompt a cloud administrator and/or the affected tenants to reschedule the reservation.

In some cases, fleet management logic 132 may halt pending operations within the selected wave. For example, if fleet management logic 132 determines that more than a threshold number of operations have already failed, and there are still operations that are still in process, then fleet management logic may cancel or delay these pending operations. This helps reduce the number of failures within the selected wave. In other cases, fleet management logic 132 may allow all operations to complete, either successfully or unsuccessfully, within the selected wave.

Responsive to delaying or cancelling the scheduled operations, fleet management logic 132 sends a notification to the affected tenants and the cloud administrator (Operation 610). The notification may include information indicating that the reserved operation could not be executed at the reserved time and, if automatically rescheduled, the new reservation time. In addition or alternatively, the notification may present other time windows as alternative options so that the affected tenants may change the reservations. In one or more embodiments, the notification that is sent to the tenants does not include any tenant-identifying information. For example, if the cancellation was triggered by a failure to update cloud targets available to tenant A, and cloud targets available to tenant B are scheduled to be updated in a subsequent wave, the notification to tenant B may exclude details identifying tenant A.

If the operations success rate satisfies the threshold, then fleet management logic 132 determines whether there are any remaining waves to process (Operation 612). If there are remaining waves, then the process returns to operation 602, where the next wave is selected. The process then repeats for the next selected wave. In one or more embodiments, the process may omit analyzing the success criteria for the last wave (or last set of waves). For example, if the process has reached the final wave, then there are no subsequent waves in the time window to cancel. Thus, fleet management logic 132 may treat failures in the last wave, if any, using manage by exception, as described in further detail below.

10. Operation Backlog Interface

Even if all waves within a time window complete successfully, there may still be some operations that have failed. For instance, scheduled operations may have completed with a 95% success rate, satisfying the threshold to classify each wave as successful. However, 5% of the operations still have failed in this example. As previously indicated, these failed operations may be addressed by a process referred to as manage by exception.

With manage by exception, information about the failed operations is added to one or more data structures, such as queues, tables or lists, that store data identifying maintenance items to be addressed. The information added may include various details about the failed operation, including, but not limited to:

The name of the operation, the type of operation, and other information identifying what operation was attempted;

Hostnames, IP addresses, and/or other information identifying the cloud target or targets to which the operation was directed (i.e., the cloud target(s) for which the operation was reserved);

Tenant names, contact information, and/or other information identifying the tenant that reserved the operation or on whose behalf the operation was scheduled; and/or Diagnostic data, such as the time the operation failed, identified causes of the failure, and recommended actions, if any.

In one or more embodiments, control console 150 includes logic for presenting information about the failed operations to one or more cloud administrators. For example, a cloud administrator may submit a request to view the current maintenance backlog within a cloud environment. In response, control console 150 may display an interface that allows a user to view and navigate through the details of the failed operations. As will be described in further detail below, the interface may further allow the cloud administrator to perform various actions on individual cloud targets as well as groups of targets.

FIG. 7 depicts example interface 700 for managing operation backlog, in accordance with one or more embodiments. Interface 700 may be displayed responsive to a selection by an administrator to view the current maintenance belong. Interface 700 includes summary view 710, which display various charts summarizing the operation backlog. Chart 712 visually represents operation groupings by operation type (patching, backup), chart 714 represents operations grouped by status (failed, not attempted), and chart 716 represents operations grouped by tenant (tenant XYZ, tenant BB). Detailed view 720 provides a list of individual cloud targets for which operations have failed or were not attempted (e.g., because a previous wave failed). The cloud administrator may user interface 700 in order to perform remedial actions on individual cloud targets or groups of cloud targets. Example remedial actions may include, but are not limited to:

- Creating a new time window to reattempt execution of the failed operations. For example, cloud targets displayed within detailed view 720 may have failed during operations previously reserved by tenant XYZ and tenant BB. The cloud administrator may create a new time window to reschedule execution of the patching and/or backup operations for one or more the listed cloud targets.
- Reattempting execution of the failed operations within an existing time window. If there are reservation slots available in an upcoming time window, the cloud administrator may reserve available slots for the listed cloud targets. The system will then reattempt execution of the patching and/or backup operations at the time scheduled within the existing time window.
- Accepting or suppressing the selected exceptions. With this action, the cloud administrator may allow the cloud target to continue operating without reattempting execution of the failed operation. This action may be used in cases where reattempting the operation is likely to fail or otherwise not wanted.

Interface 700 allows the administrator to toggle the cloud targets and operations that are presented based on various attributes. For example, the administrator may filter failed operations by operation type, status, tenant, or any other attribute.

11. Adaptable Success Criteria

In the example embodiments provided above, the success criteria are used to determine whether or not to halt execution of a wave of operations. In one or more embodiments, the success criteria may be evaluated independently for each wave. For instance, if the success criteria mandate an 80% success rate to proceed to the next wave, then the system may analyze the first wave to determine whether the first wave operations were 80% successful. If so, then the process may then analyze the second wave independently, ignoring failures in the first wave, to determine if the second wave was 80% successful. If the second wave is less than 80% successful, then the third wave may be halted.

Instead of analyzing the success criteria independently, in one or more other embodiments, the success criteria may be analyzed on a cumulative basis. In the example where the first wave satisfies an 80% success rate threshold, the process may analyze the combined success rate of the second and first wave to determine whether the combined wave success rate satisfies the 80% success rate threshold. If it does not, then the third wave may be halted. Otherwise, the operations reserved in the third wave may execute as scheduled. This process may continue, with the cumulative success rate determined at each wave. As can be seen, the determination of whether a success threshold is satisfied may vary from implementation to implementation.

In addition or alternatively, the success criteria may be modified automatically based on a set of service attributes. Example service attributes may include, but are not limited to, service performance attributes, such as bandwidth and resource usage trends, maintenance backlog, and the number of operation time windows available. As an example, the success threshold may be decreased as the total number of items (e.g., failed operations) in the maintenance backlog decreases and increased as the total number of items in the maintenance backlog increases. In other words, a greater number of failed operations may be permitted before a wave is halted if the administrator has a greater bandwidth to address problems. As another example, success thresholds may be increased when the detected performance of a cloud service (e.g., DBaaS) decreases and vice versa. This halts operations more quickly in the event that service degradation is detected. In yet another example, the success threshold may be adjusted based on availability of future time windows. The greater the availability, the more quickly failed operations may be rescheduled, allowing the success threshold to be lowered. On the other hand, if there is a large number of operations already scheduled and limited availability, then the success threshold may be raised. In other examples, the success threshold may be adapted based on any combination of these factors. For example, the success threshold may be selected to balance service performance, administrator bandwidth, and available maintenance windows.

In addition or alternatively to adaptively adjusting the success criteria, the number of operation windows may be increased and/or decreased based on one or more of the service attributes listed above. As an example, as the backlog and/or bandwidth of a cloud service increases, the number of scheduled operation maintenance windows may also be increased. This may help address problems more quickly as failed operations may be rescheduled with greater ease.

12. Fleet Operation Interface and Monitoring Dashboard

In one or more embodiments, control console 150 provides an interface through which users may manage various aspects of fleet operations. For example, the interface may allow an administrator to define, edit, and publish operations available for reservation by tenants. These operations may be made viewable to tenants through a calendar interface such as depicted in FIG. 4. Control console 150 may further provide interfaces through which the administrators may track the reservation status of published operations, such as information identifying which tenants have reserved slots within a time window, the remaining reservation capacity of a time window, and the scheduled execution times of an operation.

FIGS. 8A to 8G depict an example GUI through which administrative users may create, edit, and publish fleet operations that are available for reservation in accordance with one or more embodiments. A "fleet operation" in this context refers to an operation that is available to be reserved by multiple tenants. For example, fleet operations that are published through the interface may be made viewable to a set of tenants, such as previously described. An instance of a fleet operation may correspond to a plurality of individual operations that have been reserved within a maintenance window. For example, an instance of a patching operation may involve a large number (e.g., thousands) of individual patching operations. A published fleet operation may be associated with a single time window (a single instance), or multiple time windows (multi-instance), that tenants may browse through the calendar interface previously described.

Figure 8A:
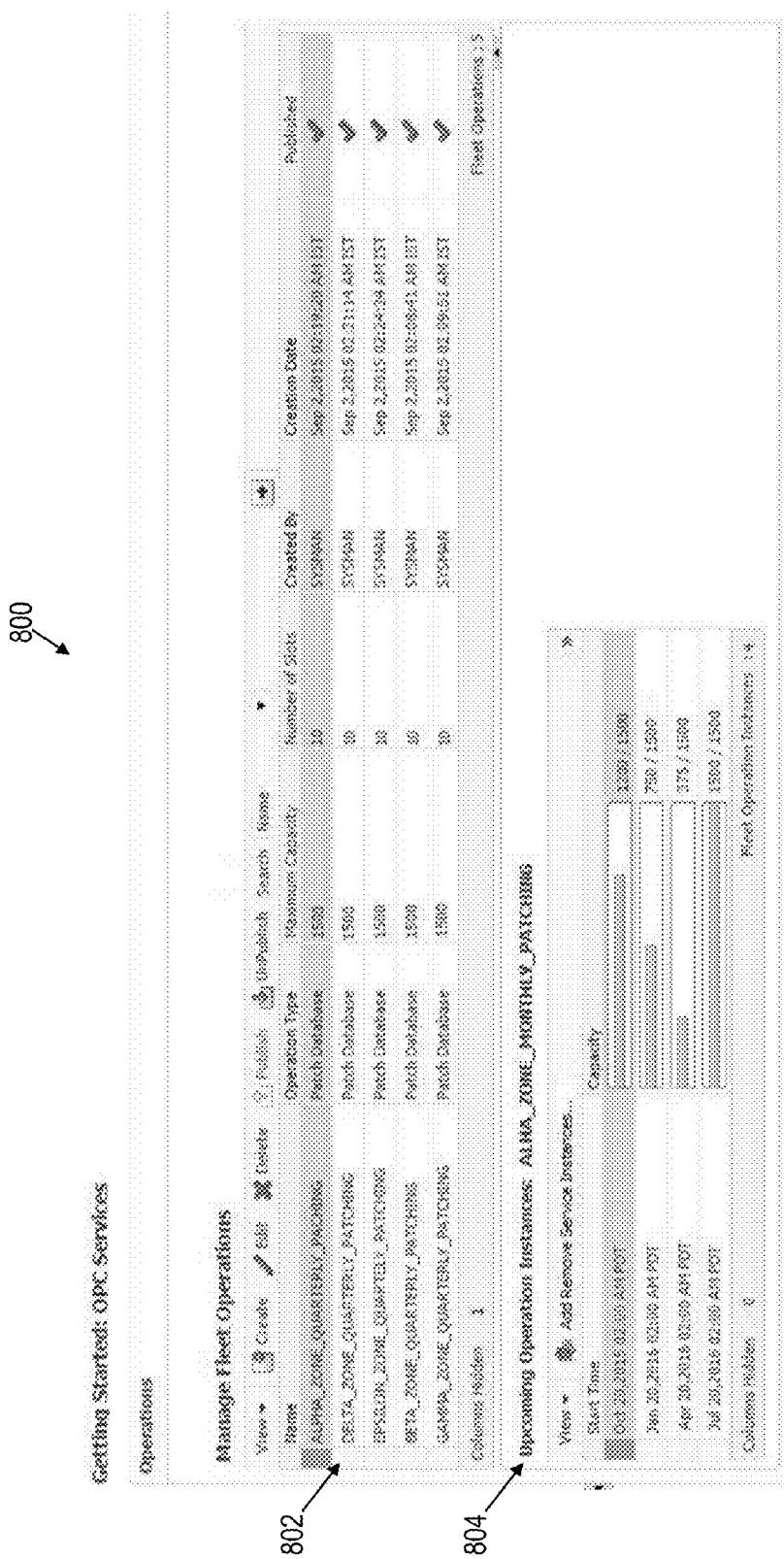
FIG. 8A illustrates an example interface for managing fleet operations in accordance with one or more embodiments.

FIG. 8A depicts example interface 800 for managing fleet operations in accordance with one or more embodiments. Interface 800 includes display panel 802 and display panel 804. An administrative user may interact with display panel 802 to view current and pending fleet operations, create new fleet operations, delete existing fleet operations, and publish/unpublished fleet operations. Responsive to selecting a pending fleet operation from display panel 802, display panel 804 displays upcoming instances of the selected operation, including the instance start time, the number of reservations that have been made for the instance, and the remaining/total reservation capacity.

Figure 8B:
FIG. 8B illustrates an example interface for creating a new fleet operation in accordance with one or more embodiments.

FIG. 8B depicts example interface 810 for creating a new fleet operation in accordance with one or more embodiments. Interface 810 may be displayed responsive to a user selecting the "create" tab displayed within display panel 802, and corresponds to the first interface in a workflow to facilitate creation of a new fleet operation. Input box 812 allows the user to name the new fleet operation, and input box 814 allows the user to add a description about the fleet operation. In the example illustrated, the description indicates that the fleet operation is being created to patch databases in a particular compute zone on a quarterly basis. In other examples, fleet operations may be created for different types of operations and over different timeframes.

Figure 8C:
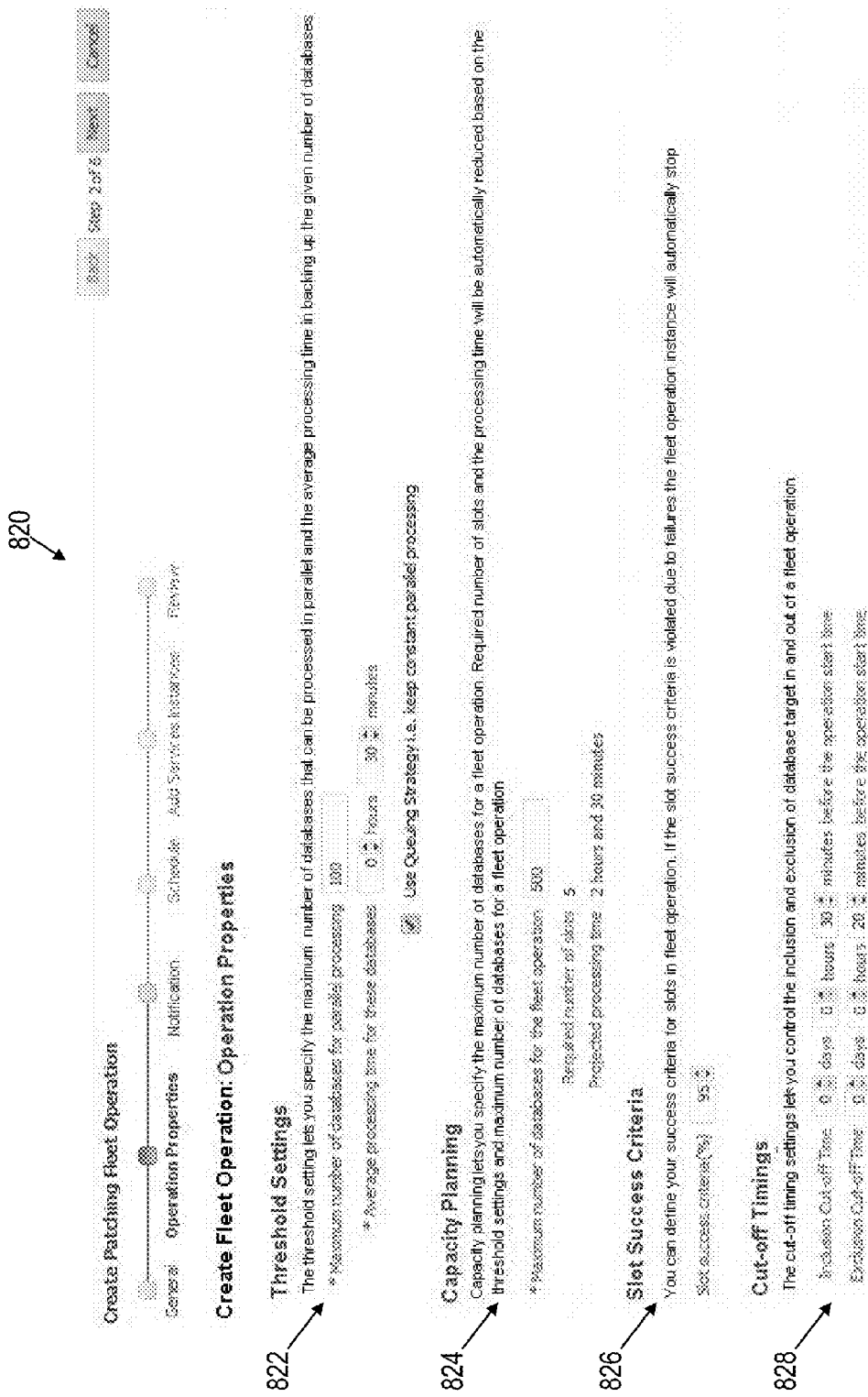
FIG. 8C illustrates an example interface for defining properties associated with a fleet operation in accordance with one or more embodiments.

FIG. 8C depicts example interface 820 for defining properties associated with a fleet operation in accordance with one or more embodiments. Interface 820 includes input threshold setting field 822, capacity planning field 824, success criteria field 826, and cut-off timing field 828. The values within these fields may be defined and edited by an administrative user to control fleet operation scheduling and execution. In the present example, threshold settings field 822 specifies that 100 database targets may be processed in parallel and that the average operation time is 30 minutes. Capacity planning field 824 defines the maximum number of databases (or reservation slots) in an instance of a fleet operation. Based on this number, capacity planning field 824 displays the number of time slots and projected processing time per maintenance time window (or instance of the fleet operation). The number of time slots is derived by dividing the maximum number or reservation slots by the number of cloud targets that may be processed in parallel. Thus, in the present example, there are five time slots (or waves) with 100 reservation slots each. The projected running time, which corresponds to the span of the maintenance window, is derived by multiplying the average operation time by the number of time slots. Success criteria field 826 defines the success rate threshold for each time slot/wave of the operation. In the example illustrated, operations are halted if a 95% success rate per time slot is not achieved. This value may be adjusted anywhere between 0% to 100%. Cut-off timing field 828 defines the inclusion and cancellation cut-off times for reserving slots within an instance of the fleet operation. In this instance, slots may be reserved up to 30 minutes before a maintenance time window. After the inclusion cut-off time is reached, new reservations are not accepted. In addition cut-off timing field 828 specifies that cancellations may be made up to 20 minutes before the maintenance time window. Cancellations are prevented once the exclusion cut-off time has been reached.

Figure 8D:
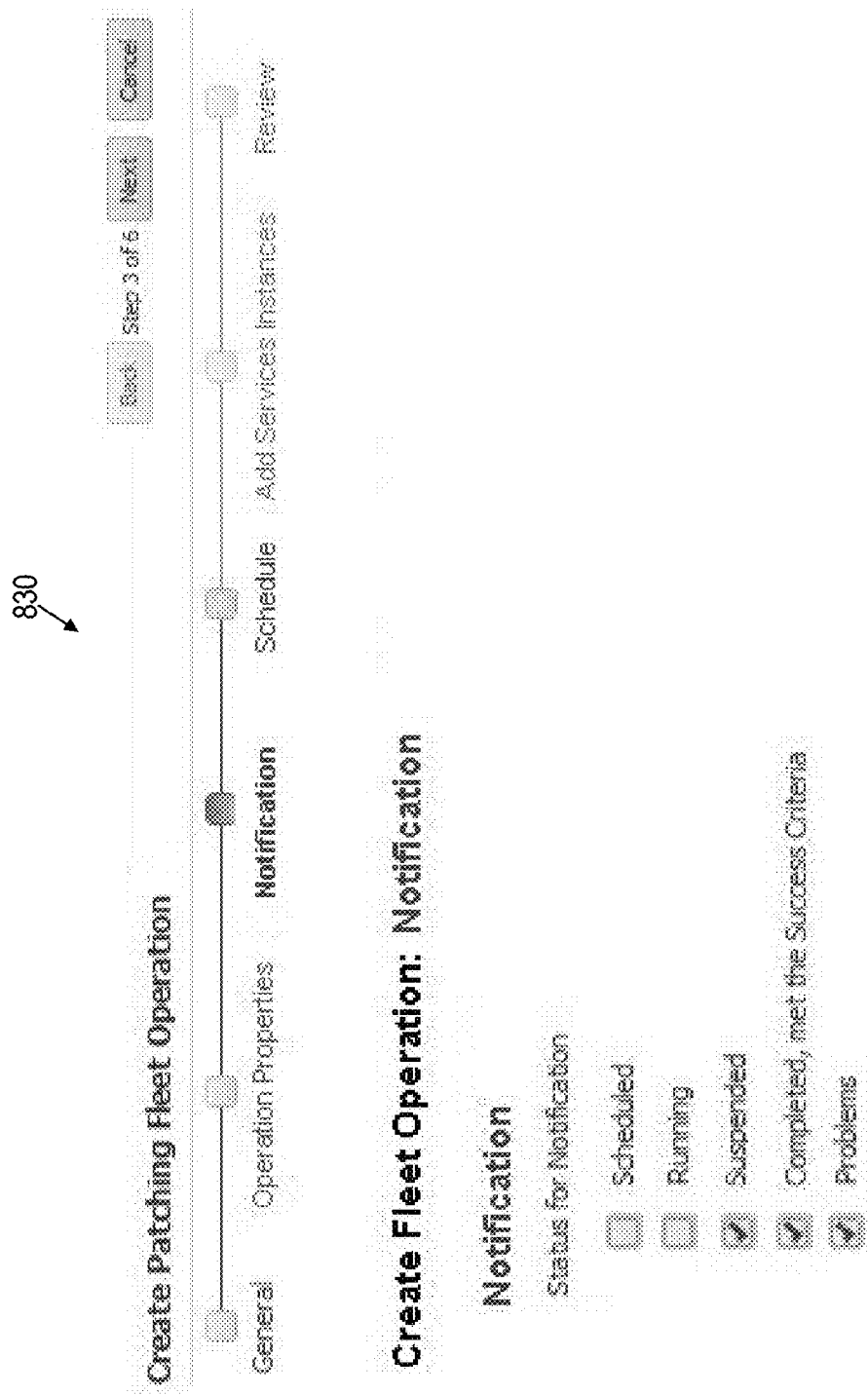
FIG. 8D illustrates an example interface for defining notification policies in accordance with one or more embodiments.

FIG. 8D depicts example interface 830 for defining notification policies in accordance with one or more embodiments. Interface 830 allows an administrator to specify the events that trigger notifications. Example events include, but are not limited to scheduling an instance of a fleet operation, starting an instance of a fleet operation, suspending an instance of a fleet operation, successfully completing an instance of a fleet operation, or identifying problems within an instance of a fleet operation. Once the notification policies have been defined and stored, fleet management logic 132 monitors for the occurrences of the specified events. Responsive to detecting one or more of the events, fleet management logic 132 may send an email or other notification to the administrator.

Figure 8E:
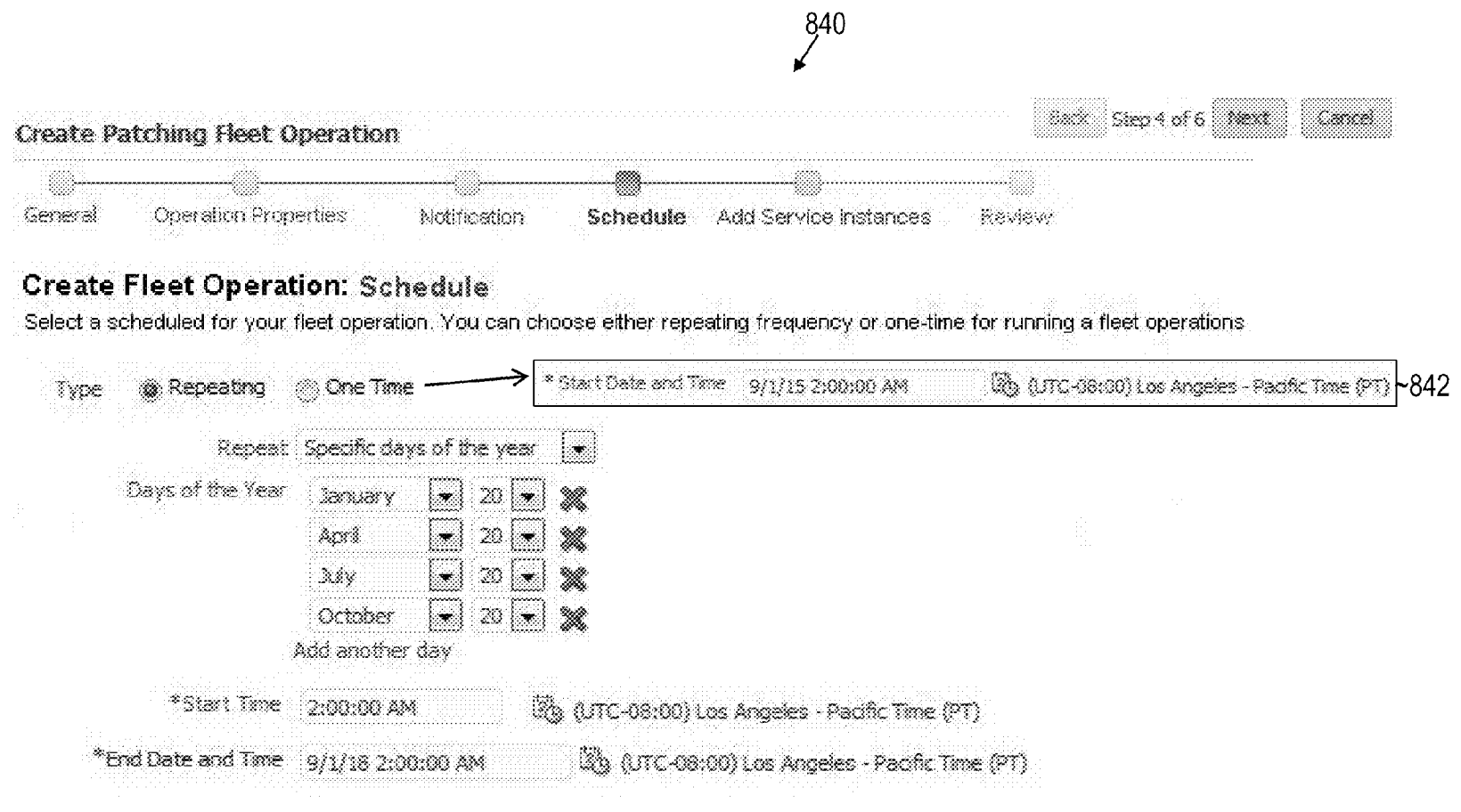

FIG. 8E depicts example interface 840 for scheduling instances of a fleet operation in accordance with one or more embodiments. In example depicted, a user has scheduled a quarterly fleet operation by selecting the "Repeating" radio button of interface 840 and specifying the four days of the year during which the fleet operation is executed. Tenants may subscribe to the fleet operation to reserve slots for each instance of the fleet operation or may reserve slots within individual instances. The administrator further specifies a start time for each instance of the fleet operation and an end date/time to stop scheduling instances of the fleet operation. If the user would like to schedule a single instance of the operation instead of or in addition to the repeating schedule, the user may select the "one time" radio button. In response, the user is presented with an interface such as depicted in box 842 to specify the start date and time of the fleet operation.

Figure 8F:
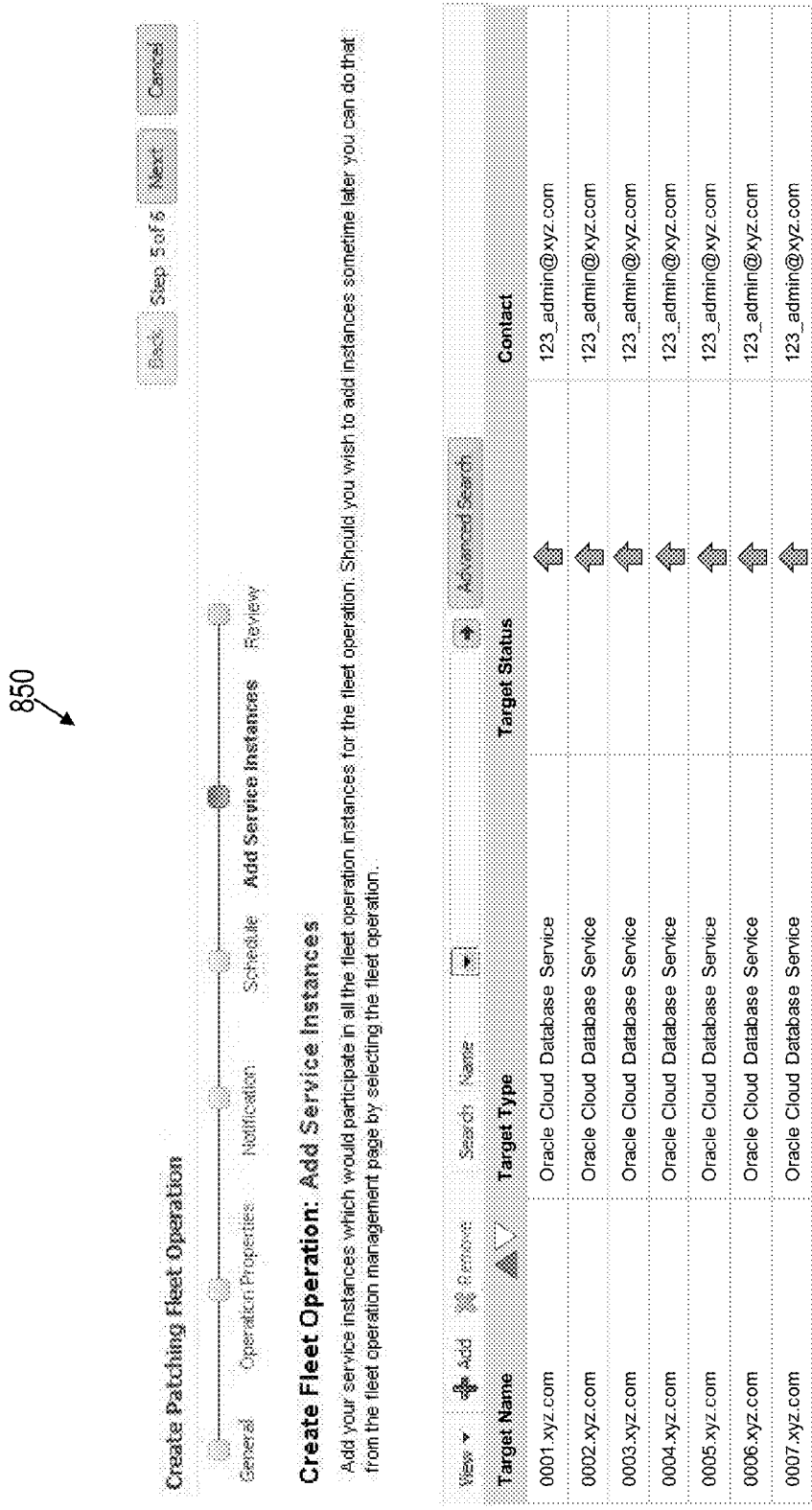
FIG. 8F illustrates an example interface for adding service instances to a fleet operation in accordance with one or more embodiments.

FIG. 8F depicts example interface 850 for adding service instances to a fleet operation in accordance with one or more embodiments. In the example depicted, the administrator has added multiple instances of a DBaaS. Services may be added at a later time as well, either by the cloud administrator or by the tenant through a reservation request.

FIG. 8G depicts example interface 860 that provides a summary of a fleet operation. The summary includes information input through the sequence of GUI screens presented during the create operation workflow.

In one or more embodiments, control console 150 provides an interface, such as a dashboard, that presents various fleet operation metrics. A dashboard interface allows an administrator to monitor the current and historical trends of fleet operations. As instances of fleet operations are executed, the metrics that are presented by the dashboard interface may be updated in real-time to give the administrator details about the current status of the fleet operations in a format that is easy to digest.

Figure 9A:
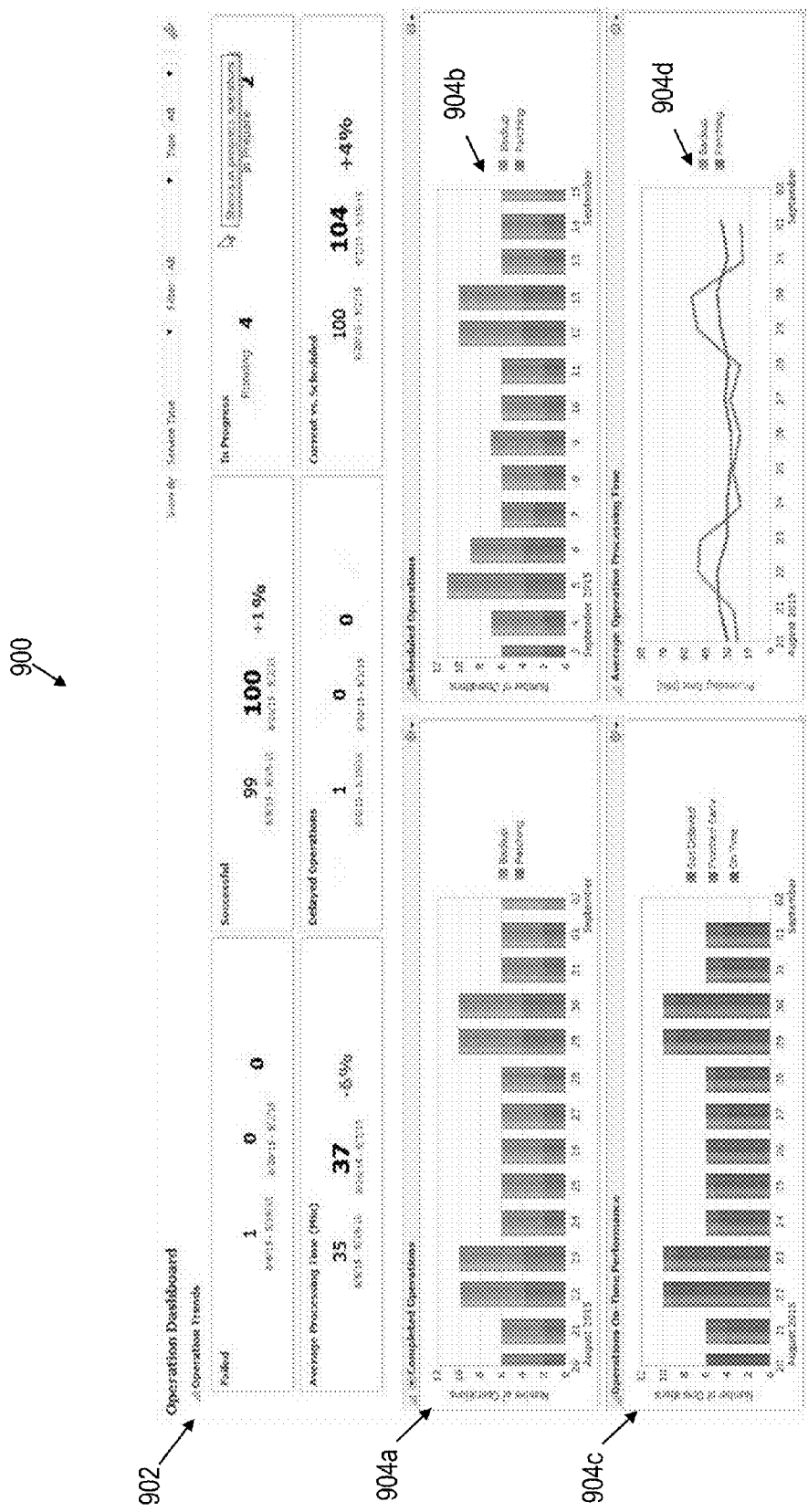
FIG. 9A illustrates an example dashboard interface for monitoring fleet operations in accordance with one or more embodiments.

FIG. 9A depicts example dashboard interface 900 for monitoring fleet operations in accordance with one or more embodiments. Operation trends view 902 displays various metrics associated with pending and historical operations executed on cloud targets, including metrics identifying how many operations have failed, how many operations have completed successfully, how many operations are active and in progress, the average processing time per operation, how many operations have been delayed, and the ratio of current versus scheduled operations. Below operation trends view 902, various charts are display, including charts 904a, 904b, 904c, and 904d. Chart 904a identifies the total number of completed operations over the past two weeks, and chart 904b identifies the total number of scheduled operations over the next two weeks. The total number of completed and scheduled operations are segmented so that the number of completed/scheduled operations by operations type may also be determined. In the present example, one color (e.g., green) of each bar represents backup operations and a second color (e.g., red) represents patching operations. Chart 904c depicts the operations on-time performance over the past two weeks. One color on each bar in chart 904c represents operations that completed on-time, a second color represents operations that completed early, and a third color represents operations that were delayed. Chart 904d plots the average processing time per operation over the past two weeks, with one plot representing backup operations and a second plot representing patching operations. The metrics and charts that are displayed within dashboard interface 900 may be configurable by the administrator. For example, the administrator may change the timeframe of the charts to view the past month of operations or change the metrics that are plotted. Thus, the administrator may customize the dashboard views to present the most relevant information for monitoring fleet operations.

Figure 9B:
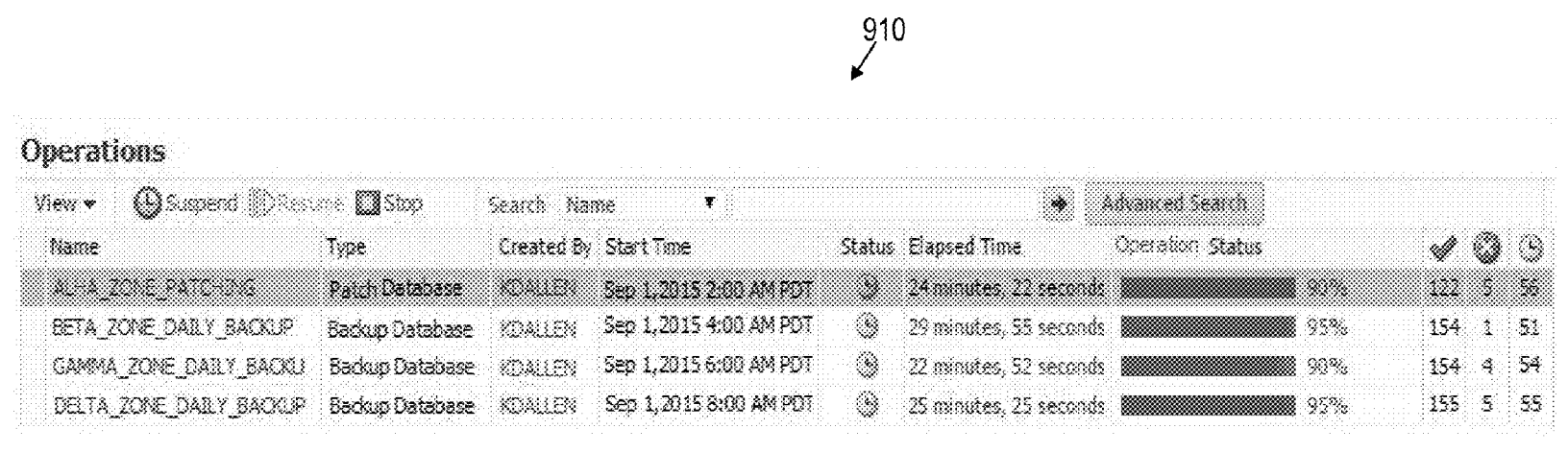

FIG. 9B depicts example interface 910 for monitoring active fleet operations in accordance with one or more embodiments. As can be seen, interface 910 displays various information about the active fleet operations including the operation names, the operation types, the creator (i.e., the username of the administrator that created the operation), the operation start time, the operation status, the completion ratio, and the individual operation completion status. The individual operation status indicates how many reserved operations within a fleet operation maintenance window have succeed, how many have failed, and how many are in progress.

Responsive to the user selecting a fleet operation within interface 910, a drilled-down display may be presented to provide more detail about the selected fleet operation. FIG. 9C depicts an example interface 920 for providing a detailed report of an active fleet operation in accordance with one or more embodiments. Interface 920 may be displayed responsive to a user selecting the "ALPHA_ZONE_PATCHING" fleet operation within interface 910. Interface 920 displays the status of each time slot within the maintenance window. As can be seen, the first slot is in progress, and the remaining three slots have not yet started. The individual service target operation details are also displayed for the first slot that is in progress. The details identify which of the individual operations have completed and which are still running. The details further specify contact information for the tenant that reserved the operation and the elapsed time of the operation.

Figure 9D:
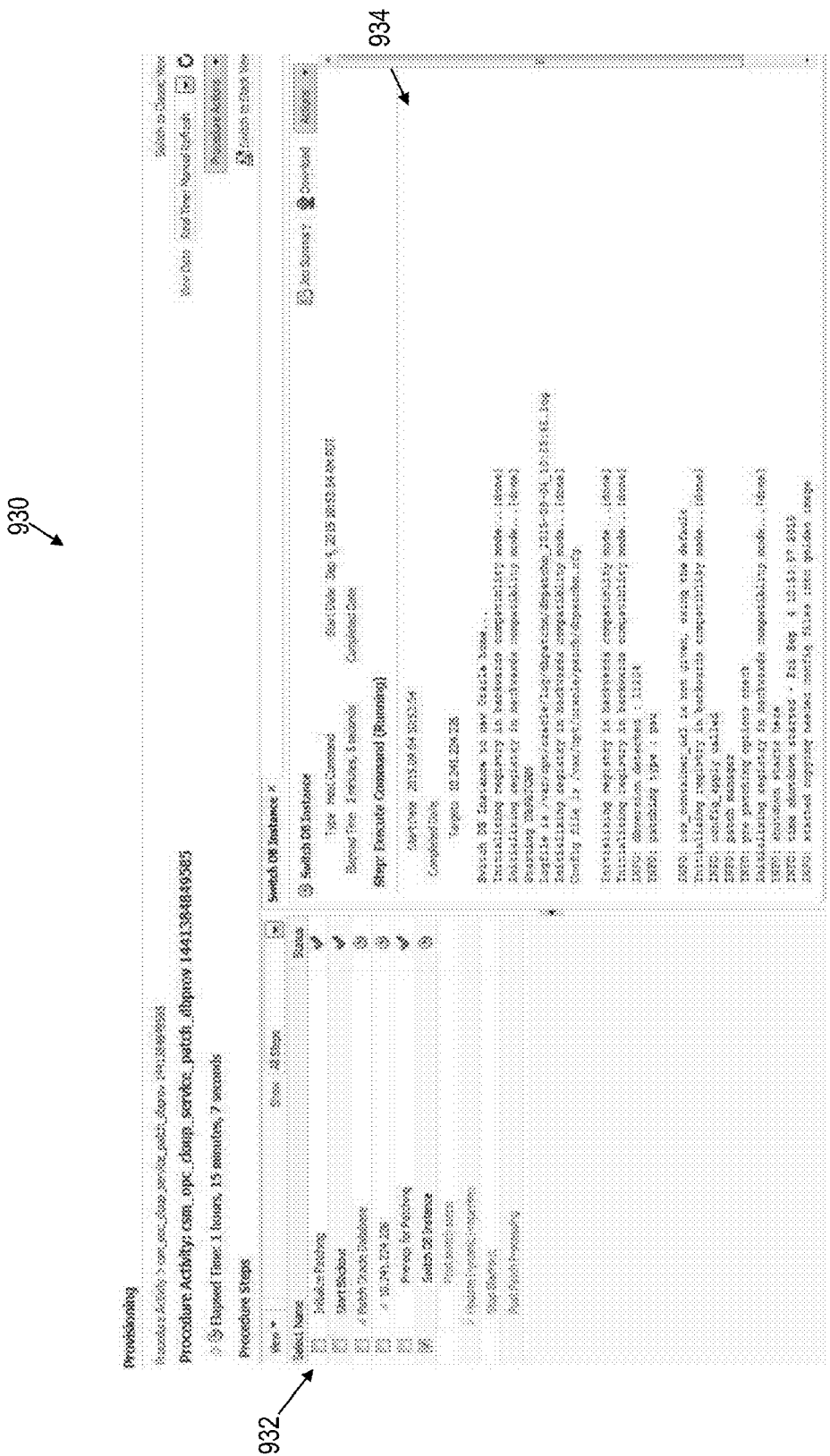
FIG. 9D illustrates an example interface for providing a detailed report of an individual service operation in accordance with one or more embodiments.

Responsive to the user selecting an individual service operation within interface 920, a drilled-down display may be presented to provide more detail about the selected service operation. FIG. 9D depicts an example interface 930 for providing a detailed report of an individual service operation in accordance with one or more embodiments. Display panel 932 presents the individual procedure steps of the selected service operation and the status of each individual procedure step. Display panel 934 presents detailed information about individual procedure steps that have been selected. In the example illustrated, display panel 934 presents detailed monitoring of script logs for the procedure step "Switch DB Instance". Interface 930 allows administrators to monitor individual service operations at the individual target level to gain insights into what is happening at a finer level of granularity.

Figure 9E:
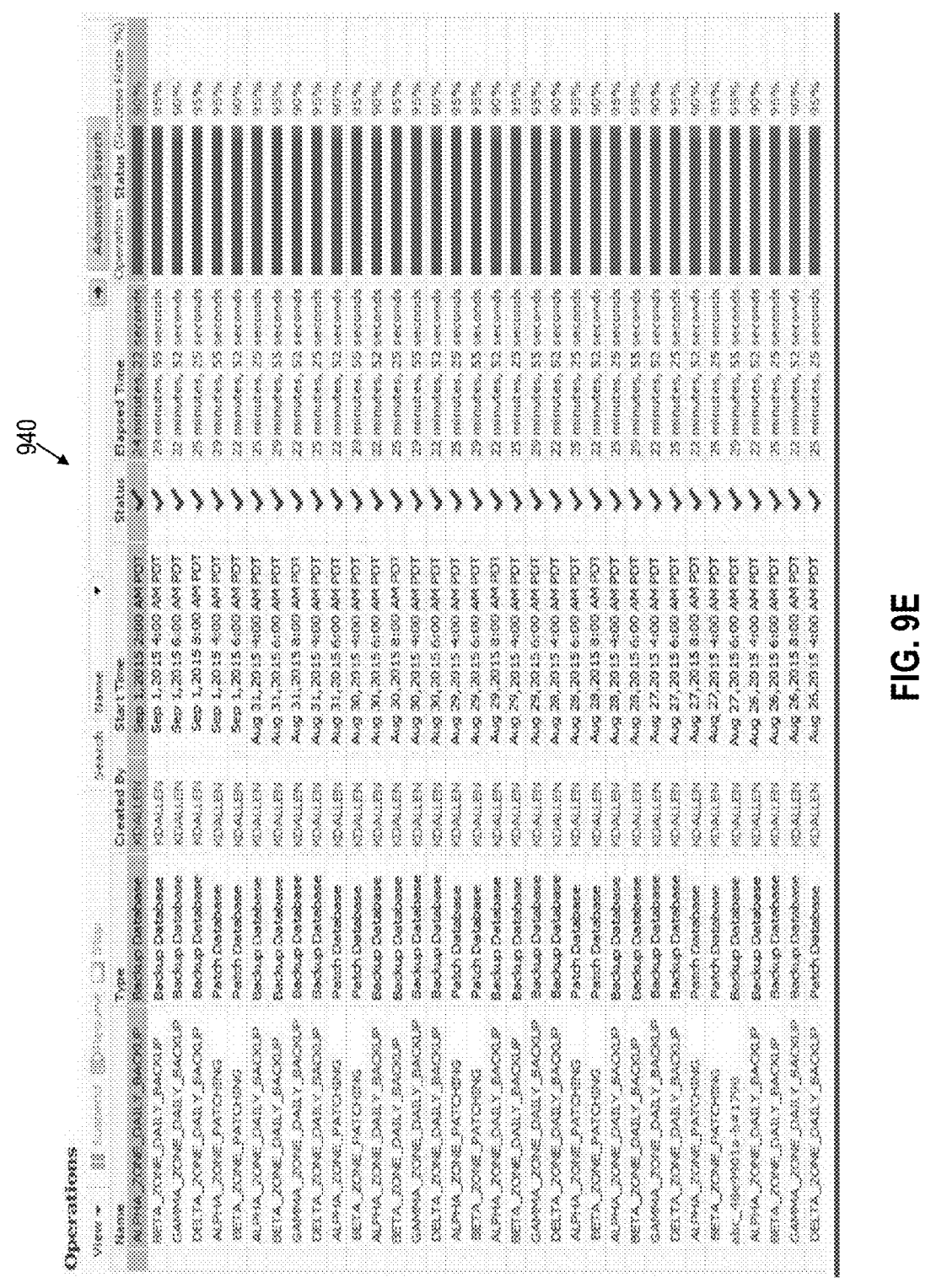

In addition to drilling down on active operations to navigate details at different levels of granularity, interface 900 also allows the administrator to drill down on historical and scheduled operations. For example, FIG. 9E depicts example interface 940 for providing a history of successful operations. Interface 940 presents various information about the successful operations, including the operation type, operation creator, operation start time, status, elapsed time, and individual operation completion status. The administrator may further drill down on each individual fleet operation similar to navigate details similar to those described above for the active operations. For example, if the user selects "ALPHA_ZONE_DAILY_BACKUP", a more detailed view of the time slots may be presented similar to interface 920. The fleet operation dashboard thus allows administrators to quickly navigate through a large number of operations to monitor operation status, detect problems, if any, and resolve the problems in an expedited manner.

13. Service Dashboard and Monitoring

In some cases, a tenant that is accessing a cloud service may not be aware of the underlying infrastructure supporting the cloud service. For example, a tenant accessing a DBaaS may not be aware of or have control over the physical storage filers where database files are stored. As another example, the tenant may not be aware of the operating system, CPU, and other characteristics of a computing device or set of computing devices hosting the service. Cloud administrators may also update and otherwise modify the underlying infrastructure that supports a service. For instance, a cloud administrator may migrate a tenant's database objects from one storage filer to another without the tenant being aware or even having permission to view the underlying infrastructure.

Tenants may also be unaware of other tenants that are sharing the underlying infrastructure of a cloud service. For example, a single storage filer may store database objects for multiple instances of a DBaaS that are associated with different tenants. As another example, a single instance of an application may support multiple instances of an SaaS spanning different tenants. The tenant may be unaware of both the underlying hardware and/or software resources used to implement the service as well as which other tenants are sharing the underlying resources.

As tenants, in some cases, do not have permission to view or access software and/or hardware resources outside of the context of the cloud service, the responsibility of ensuring these infrastructure elements are operating properly may fall on the cloud administrator. If one tenant is consuming too much bandwidth or some other issue is causing problems with a target resource, then service degradation may occur for other tenants in the cloud environment. If not addressed promptly, the cloud administrators risk violating SLAs and otherwise providing suboptimal service to tenants.

In one or more embodiments, service action framework 134 provides a unified management system through which administrators may monitor the health of services. Cloud administrators may access service action framework 134 through control console 150 in order to view various metrics about cloud services associated with one or more tenants. Cloud administrators may further apply various filters to narrow down services of interest, as described in further detail below.

Figure 10A:
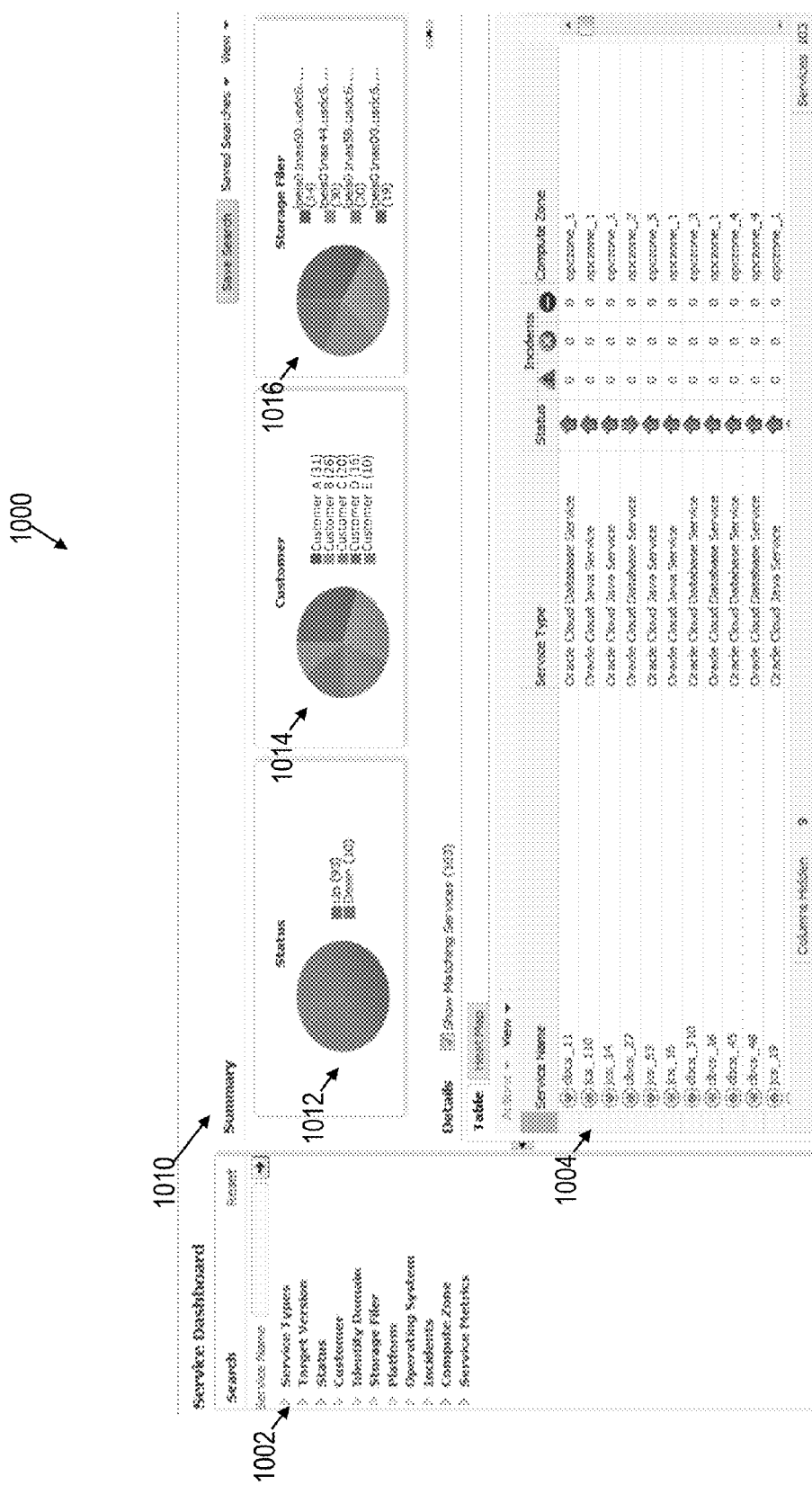
FIG. 10A illustrates an example services dashboard interface for monitoring cloud services associated with multiple tenants in accordance with one or more embodiments

FIG. 10A depicts example services dashboard interface 1000 for monitoring cloud services associated with multiple tenants in accordance with one or more embodiments. Summary view 1010 displays various charts providing details about the services provided within a cloud environment. Chart 1012 aggregates services by status, displaying the total number of services that are up and running and the total number of services that are down (i.e., not running). Chart 1014 aggregates services by tenant, displaying how many services are associated with different tenants of the cloud environment. Chart 1016 aggregates services by storage filer, displaying how many services are supported on by different storage filers within the cloud environment infrastructure.

In other embodiments, summary view 1010 may present charts that aggregate service instances based on one or more other service attributes, one or more tenant attributes, one or more infrastructure attributes, or some combination thereof. For example, another chart may be displayed that identifies all service instances associated with tenant A that are supported by a particular operating system. As another example, a chart may aggregate and display services by level/quality of service (e.g., high bandwidth, low bandwidth etc.) Thus, the charts and details that are presented may vary from implementation to implementation and may be configurable by a cloud administrator.

Display panel 1002 allows the cloud administrator to filter and group instances based on various service attributes, tenant attributes, and/or infrastructure attributes. These attributes include, but are not limited to:

Service type: This attribute may be selected to filter and aggregate service instances by service type. For example, a cloud administrator may request that the system aggregate instances of a DBaaS, a SaaS, a PaaS and/or any other type of cloud service.

Target version: This attribute may be selected to filter and aggregate service instances based on a version associated with the service. For example, a cloud administrator may request the system group all instances of a DBaaS or SaaS that are running on a certain software version and/or have a target level of patching.

Service status: This attribute may be selected to filter and aggregate service instances based on status. For example, the cloud administrator request that the system aggregate all service instances that are running and/or down.

Customer (or Tenant): This attribute may be selected to filter and aggregate service instances by tenant. For example, the cloud administrator may request the system aggregate all instances that are belong to a particular tenant or a group of tenants.

Identity Domain: This attribute may be selected to filter and aggregate service instances by identity domain associated with tenants. For example, a cloud administrator may aggregate instances of a DBaaS that are supporting financial application, tech application, and/or some other domain.

Storage Filer: This attribute may be selected to filter and aggregate service instances by storage filer. For example, a cloud administrator may request that the system aggregate all instances of a DBaaS that have database objects stored on a particular physical storage server. The cloud administrator may select or otherwise input the hostnames and/or other identifiers of the storage filers that are of interest.

Platform: This attribute may be selected to filter and aggregate service instances by the hardware and/or software platforms that are supporting the service instances.

Operating System: This attribute may be selected to filter and aggregate service instances operating system that is supporting the service instances. For example, the cloud administrator may request that the system aggregate instances of a cloud service that are hosted on a Solaris host, a Windows host, and/or some other operating system (OS) platform.

Incidents: This attribute may be selected to filter and aggregate service instances based on detected problems. For example, the cloud administrator may request that the system aggregate all cloud services that have had an update operation fail within the past month or some other timeframe.

Compute zone: This attribute may be selected to filter and aggregate service instances based on compute zones that support the cloud services. For example, the cloud administrator may request that the system aggregate all cloud services that are supported by hardware and/or software resources deployed within a particular data center. A computer zone in this context may be a physical location or device or a logical partition that contributes to executing the cloud service.

Service metrics: This attribute may be selected to filter and aggregate service instances based on various facts, such as quantified measurements, associated with instances of the cloud service. For example, the service instances may be aggregated based on performance data indicating average bandwidth, database size, data usage, average operation times, time since the last backup, etc. In one or more embodiments, the cloud administrator may use operators to search and select service instances. As an example, the operator may specify "Database Size (GB)>50" to aggregate DBaaS instances that have more than 50 Gigabytes (GB) worth of data. Other mathematical and logical operators (e.g., "<", "=", "and", "not" etc.) may be used to specify criteria for filtering and aggregating service instances.

The administrator may filter and aggregate instances by selecting or inputting values for one or more of the attributes above. Display panel 1004 displays a list of service instances that satisfy the filtering/aggregation criteria. For each service in the list, display panel 1004 identifies the service name, the service type, the status of the service, detected incidents associated with the service, and the compute zone that supports the service.

Figure 10B:
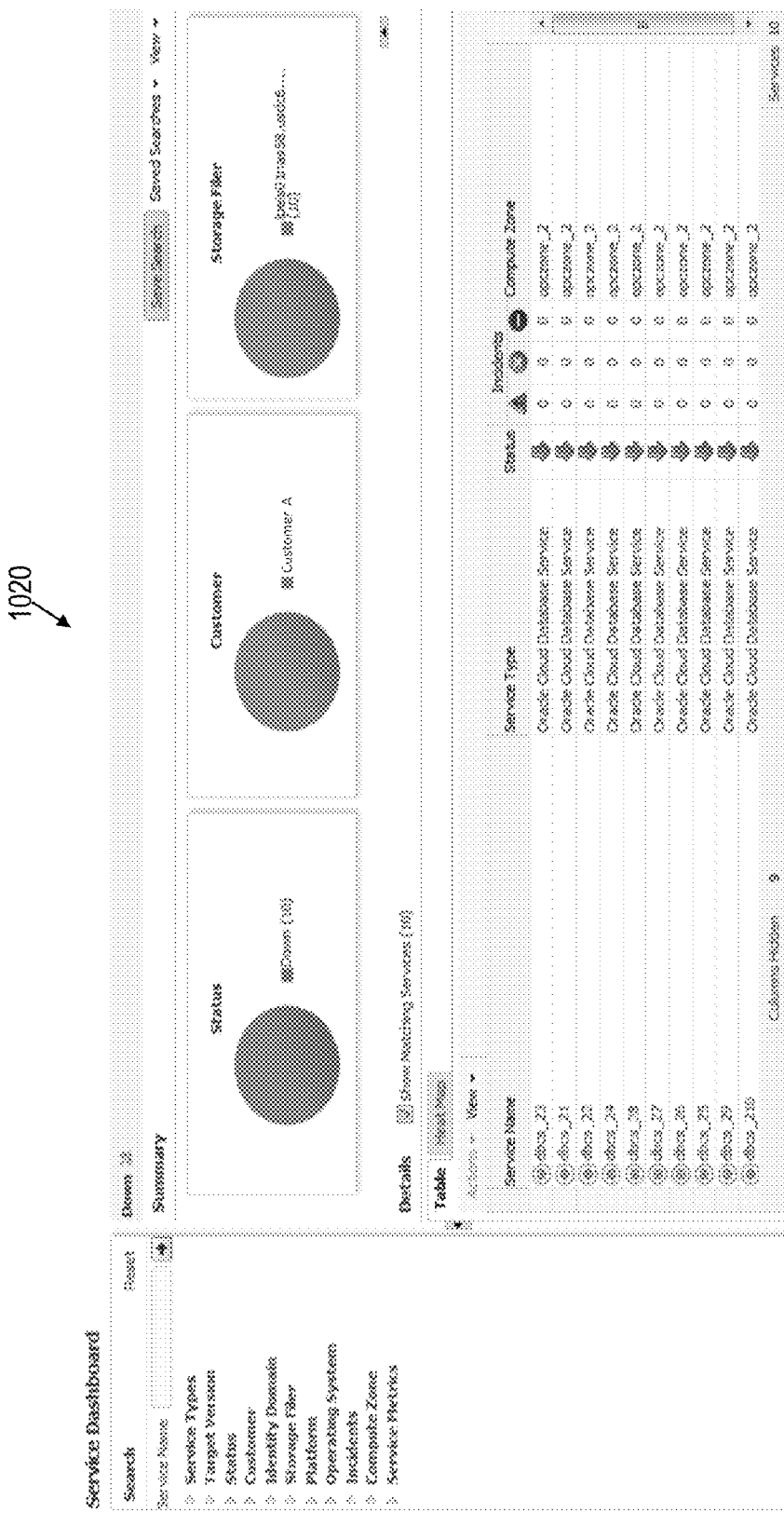
FIG. 10B illustrates an example interface for presenting an aggregated set of cloud service in accordance with one or more embodiments.

Cloud administrators may drill down by selecting individual attributes displayed within charts of summary view 1010. For example, FIG. 10B depicts example interface 1020, which may be displayed responsive to a cloud administrator selecting a specific status ("Down") from chart 1012. Responsive to the selection, charts 1014 and 1016 are updated to display the tenants and infrastructure on which the services are down. In addition, display panel 1004 is updated to display instances of a service that satisfy the selected criteria. In the present example, instances of the service that are down are all associated with tenant A and supported by a particular storage filer. Instances that do not match the selected attribute values (i.e., services that are up and running) are filtered out and not displayed. Thus, the cloud administrator may quickly navigate to service instances that are of interest and narrow down the cause of problems by filtering services based on various attributes.

14. Heat Maps

In one or more embodiments, service action framework 134 further generates and presents heat map views of services. A "heat map" in this context refers to a graphical representation of attribute values (e.g., for service or infrastructure attributes) where the values are represented as colors and/or by some other visual indicator. As an example, a red color may represent a first value, a green color may indicate a second value, a blue color a third value, etc. As another example, the color may vary over a spectrum based on the magnitude. For instance, the lowest magnitude of values may be displayed in a particular shade of green, and the highest magnitudes may be displayed in a particular shade of red. Values be displayed in a color somewhere in between the spectrum of colors representing the high and low attribute values.

Figure 11A:
FIG. 11A illustrates an example interface for presenting a heat map of services based on availability in accordance with one or more embodiments.

FIG. 11A depicts interface 1100, which presents a heat map of services based on availability in accordance with one or more embodiments. Heat map 1102 groups instances by compute zones, with boxes opczone_1, opczone_2, etc. representing different compute zones. Each compute zone box is segmented into one or more other boxes (or sub-boxes) representing storage filers, and each storage filer is further segmented into multiple boxes representing different service instances. Thus, the service instances are aggregated by infrastructure such that the administrator may quickly determine the storage filer and compute zone that supports each service instance. The graphical representation of each individual service instance may be displayed in a color that is selected based on availability. For example, instances that are up and running may be displayed in green, while instances that are down may be displayed in red. Heat map 1102 allows the administrator to quickly determine whether the services that are down are localized to a specific compute zone.

Figure 11B:
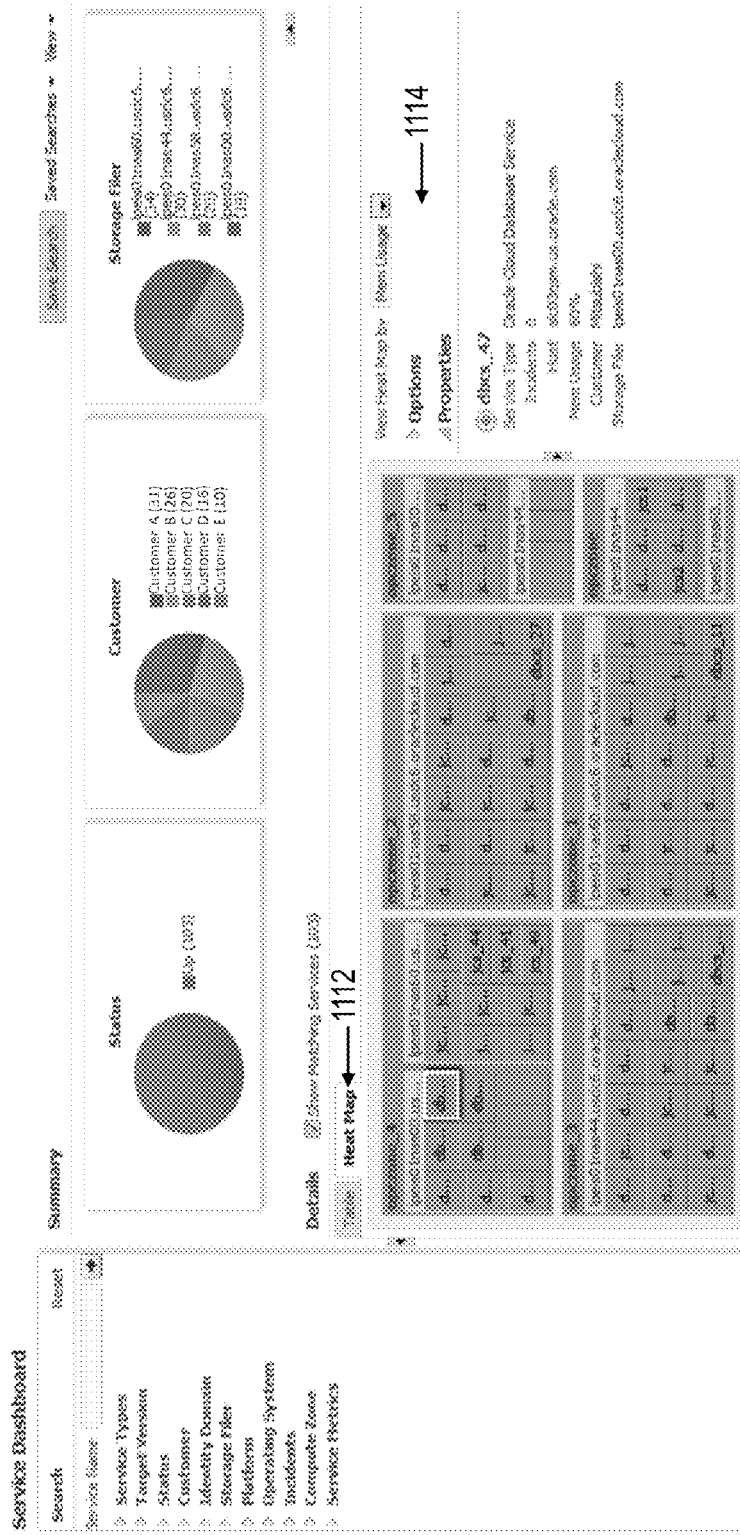
FIG. 11B illustrates an example interface for presenting a heat map of services based on performance attributes in accordance with one or more embodiments.

FIG. 11B depicts interface 1110, which presents a heat map of services based on performance attributes in accordance with one or more embodiments. Heat map 1112 also groups service instance graphical representations into boxes grouped by storage filer and compute zone. In this example, the color of the service instance indicates an amount of memory resource usage consumed to support the service instance. For example, a red box may indicate abnormally high memory usage (e.g., resource usage above a threshold amount), and a green box may indicate normal memory usage. The administrator may select an individual box to view more details about the service instance. For example, responsive to selecting a graphical representation of service instance 1114 from heat map 1112, display panel 1114 may be presented to give a detailed overview of the properties associated with the service. Heat map 1112 allows the administrator to quickly determine the individual service instances as well as the infrastructure elements (compute zone, storage filers) that are experiencing high memory resource usage, which may cause performance degradation. If a problem is detected, then one or more remedial actions may be performed as discussed in further detail below.

The example heat maps presented above localized specific service attribute values to specific infrastructure elements (i.e., storage filer and compute zone). Service action framework 134 may also generate other heat maps based on any combination of service, tenant, and infrastructure attributes provided above. As an example, a heat map may be generated to indicate CPU usage of service instances grouped by platform and OS. As another example, a heat map may display the availability of service instances grouped by tenant. Thus, service action framework 134 provides a large number of potential views that link service attributes with tenant and/or infrastructure attributes.

15. Service Actions on Aggregated Targets

Figure 12:
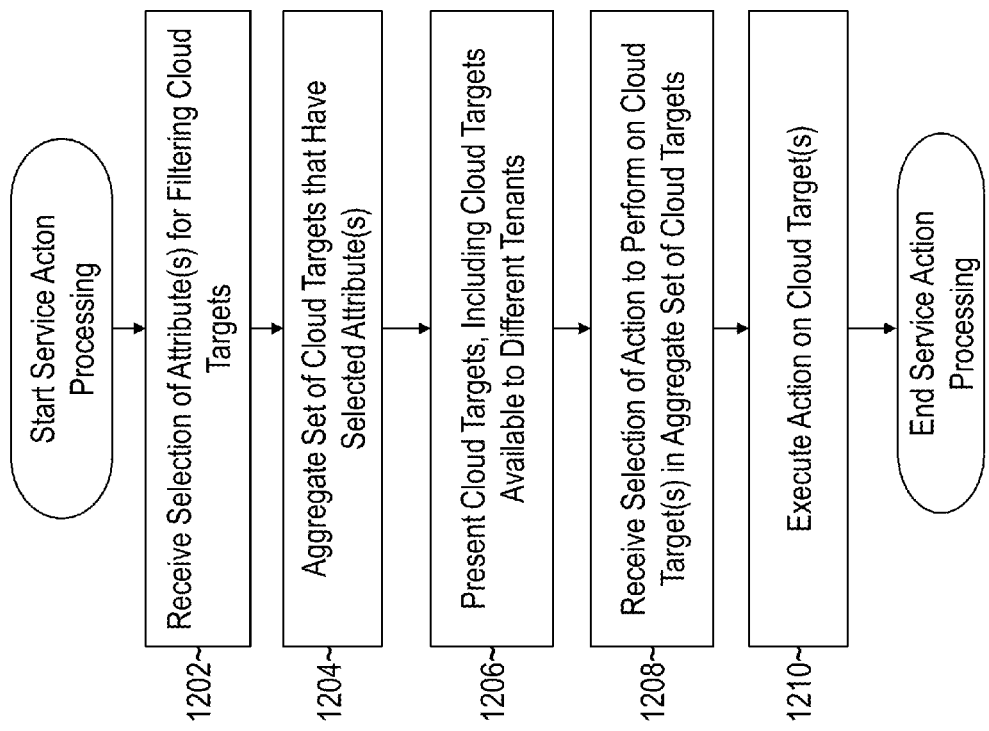
FIG. 12 illustrates an example set of operations for performing service actions on cloud targets in accordance with one or more embodiments.

Using the above described interface, users may aggregate cloud targets, including hardware resources, software resources, service operations, and service instances, based on various attributes. Once one or more cloud targets of interest have been aggregated, various actions may be performed, either on an individual target basis or on a group of targets. For instance, the cloud administrator may perform remedial actions FIG. 12 depicts an example set of operations for performing service actions on cloud targets in accordance with one or more embodiments. Service action framework 134 receives selection of a set of one or more attributes for filtering a plurality of cloud targets (Operation 1202). For example, a cloud administrator may select to filter service instances through any of the interfaces previously described. In other embodiments, attributes may be selected responsive to tenant service requests. For example, a tenant may submit a request for support if experiencing problems with a cloud service. In response, service action framework 134 may automatically search for cloud targets available to the tenant by availability that are experiencing problems.

Based on the received selection, service action framework 134 aggregates a set of cloud targets that have the selected set of one or more attributes (Operation 1204). In one or more embodiments, service action framework 134 generates a query using the selected attributes and executes the query against a corpus of cloud targets that are available to multiple tenants. As an example, a service administrator may request to view instances of a DBaaS that store more that 50 GB of data and that are currently down. In response, a query may be formed (e.g., using a SELECT statement) to retrieve, from a corpus of cloud targets that includes multiple instances of the DBaaS available to different tenants, data identifying the set of DBaaS instances that satisfy the selected criteria. In some cases, the set of DBaaS instances may include instances available to multiple tenants.

Once aggregated, service action framework 134 presents the set of cloud targets to an administrative user (Operation 1206). For example, the set of cloud targets may be presented in a list as depicted in the example interfaces above.

Service action framework 134 next receives a selection action to perform on at least one target in the set of cloud targets (Operation 1208).

Responsive to receiving the selected action, service action framework 134 executes the action on at least one target in the set of cloud targets (Operation 1210). In some cases, the action may be performed on targets available to different tenants. For example, an action may restart a first instance of a DBaaS for a first tenant and a second instance of a DBaaS for a second tenant. As another example, an action may restart a host that supports service instances for multiple tenants. The action may be executed on all of the targets in the aggregated set of cloud targets or some subset thereof. This allows the cloud administrator to perform batch remedial actions on multiple cloud targets as well on an individual, target-by-target basis.

In one or more embodiments, aggregated cloud targets may be presented to an administrator responsive to a service request. For example, a user may submit a service request to the cloud environment, which may be placed in a workflow queue. Upon selecting the service request, a query may extract one or more of the attributes to aggregate cloud targets that are relevant to the request. For example, the query may return the hardware and/or software infrastructure elements that are supporting one or more instances of the cloud service associated with the tenant that submitted the request. This allows the administrator to quickly get an overall picture of the resources supporting the cloud service for the tenant and to narrow in on potential problems, if any.

Figure 13A:
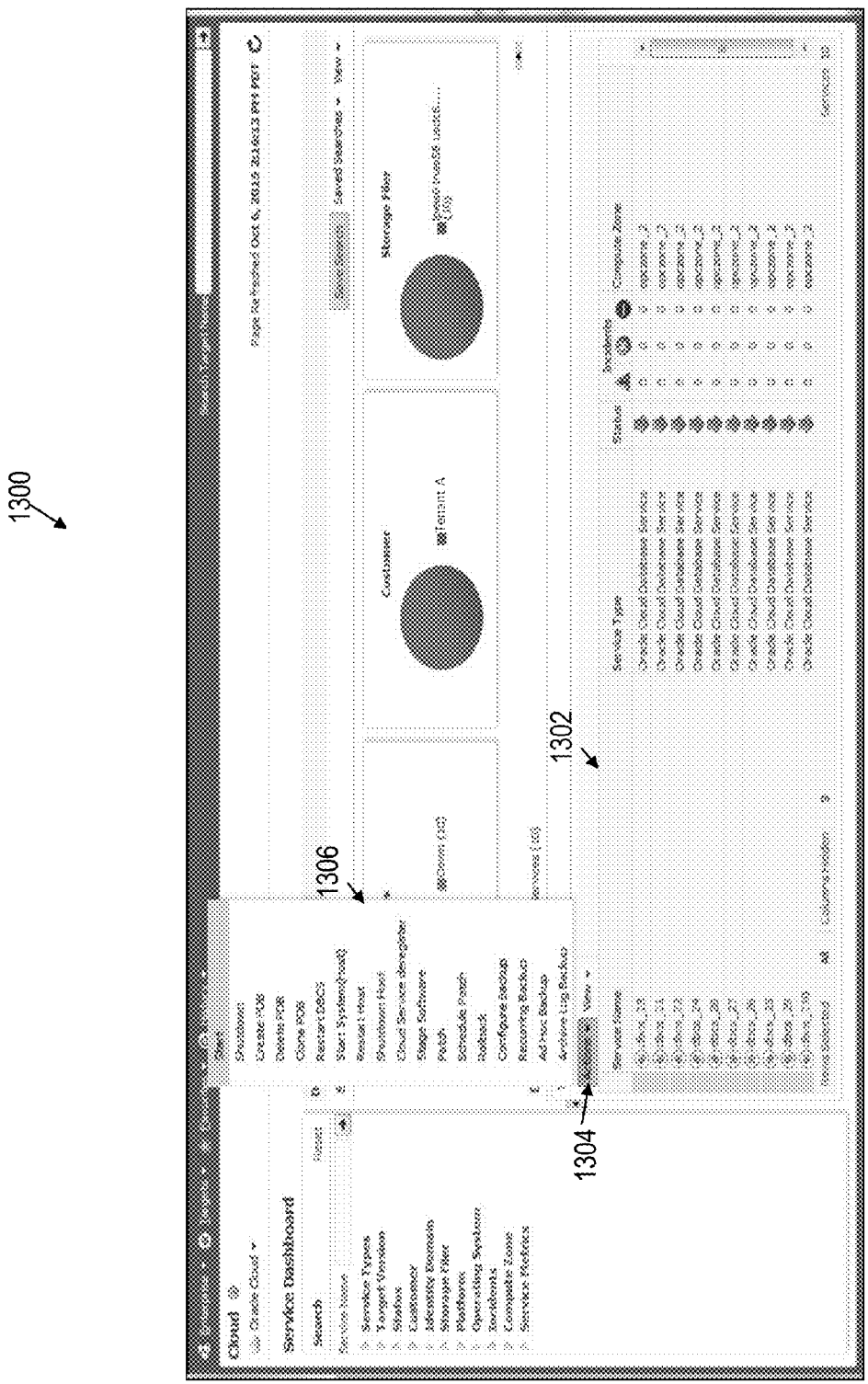
FIG. 13A illustrates an example interface for performing actions on cloud targets in accordance with one or more embodiments.

If any problems are detected, service actions framework 134 may present a variety of remedial actions that are available to perform on cloud targets being viewed. For example, FIG. 13A depicts example interface 1300 for performing actions on cloud targets in accordance with one or more embodiments. Display panel 1302 presents a set of instances of a DBaaS that are down within a cloud environment. As can be seen, these instances are associated with tenant A and supported by the same storage filer. In other examples, the instances may be associated with multiple tenants and/or storage filers. Upon selecting "actions" button 1304, drop-down menu 1306 is presented to the user. The user may select, from drop-down menu 1306, one or more of remedial actions to resolve the problems causing the service instances to be non-operational. Example actions that may be performed on selected cloud target(s) include, but are not limited to:

Start: This action may be selected to start execution of a service, host, or other cloud target when the cloud target is down.

Shutdown: This action may be selected to stop execution of a service, host or other cloud target of a host that is currently active.

Create PDB: This action generates a new pluggable database, or "PDB" for an instance of a cloud service. A PDB in this context refers to a portable collection of database objects, such as schemas, that may be "plugged into" or connected to a "container database" or "CDB". The PDBs may include data that is private to the tenants, while the CDB may comprise database resources that may be shared by tenants. PDBs may be easily migrated to different CDBs, providing flexible resource allocation within the cloud environment.

Delete PDB: This action removes a PDB from a CDB.

Clone PDB: This action copies a PDB, either within the same CDB as the source PDB that is cloned or to a different CDB.

Restart DBCS: This action stops the selected instances of the DBaaS and brings the services back online.

Start System(Host):This action starts a hardware and/or software host that supports one or more instances of a cloud service and is currently offline.

Restart Host: This action restarts an active hardware and/or software host by shutting down the target and bringing back online.

Shutdown Host: This action turns off or otherwise deactivates an active hardware and/or software host.

Cloud Service Deregister: This action deregisters a selected cloud service. For example, the tenant account associated with the cloud target may be deactivated and/or deleted.

Stage Software: This action allows the administrator to specify a location where a software target is executed. For example, the administrator may migrate a software target from one compute zone to another compute zone.

Patch: This action updates the selected cloud target by applying one or more patches.

Schedule Patch: This action schedules a future update of the cloud target.

Rollback: This action returns the selected cloud target(s) to a previous version (e.g., a version before a patch that caused problems was applied)

Configure Backup: This action allows the administrator to schedule and/or otherwise define parameters to trigger a backup operation of the selected cloud target;

Recurring Backup: This action allows the administrator to schedule periodic backups of the cloud target.

Ad Hoc Backup: This action allows the administrator to perform an on-demand backup of a cloud target.

Archive Log Backup: This action triggers execution of a backup operation on the log files within a database.

Figure 13B:
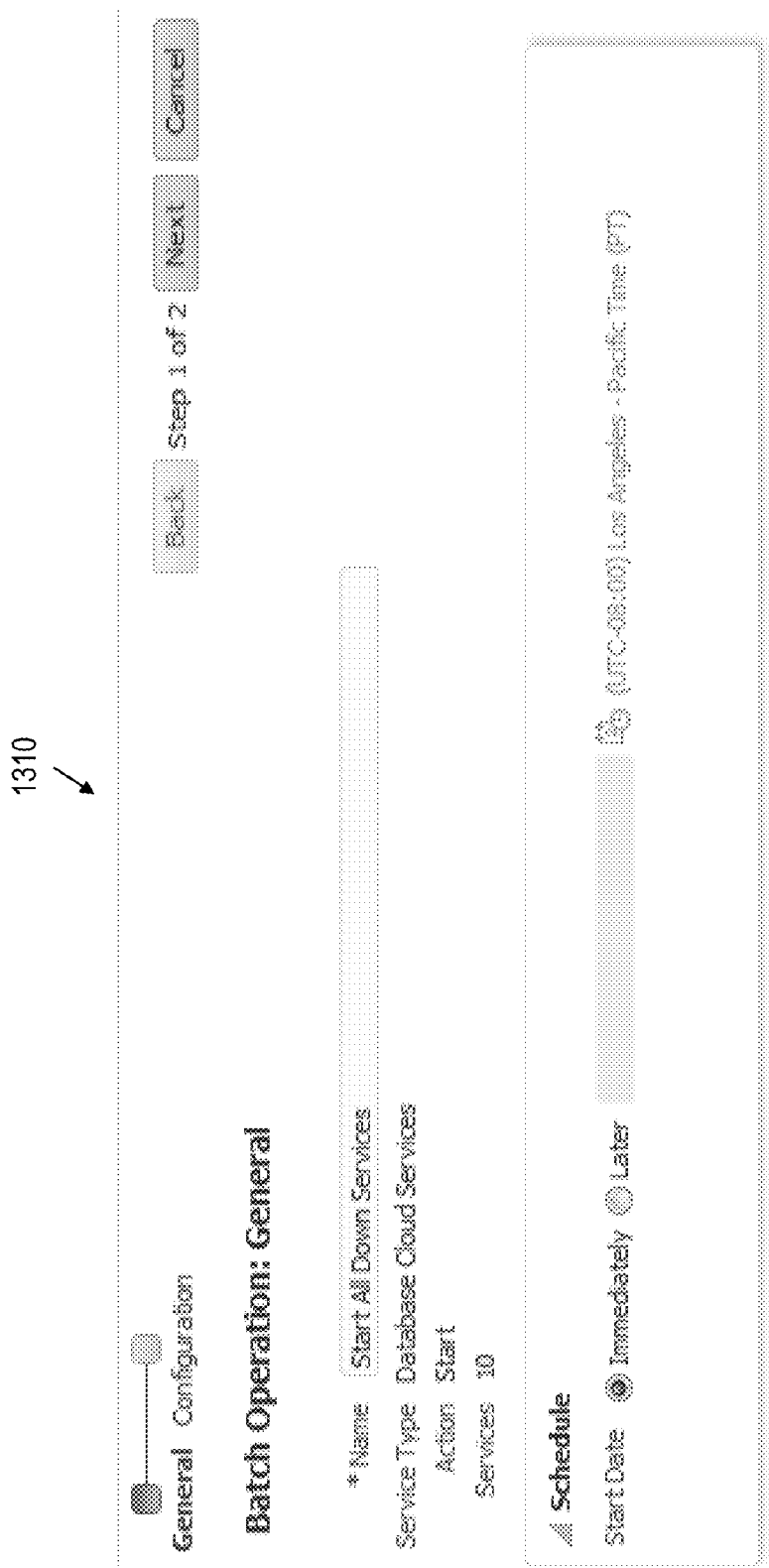
FIG. 13B illustrates an example interface for executing or scheduling execution of an action on one or more cloud targets in accordance with one or more embodiments.

Upon selecting any of the above actions, the administrator may be presented with another interface to specify action parameters. Referring to FIG. 13B, example interface 1310 is depicted, which may be displayed responsive to the user selecting the "Start" action in interface 1300. Interface 1310 allows the cloud administrator to trigger the action immediately or schedule the action at a later time. Thus, the cloud administrator may control the timing of the actions performed on the aggregated cloud targets.

16. Tenant-Specific and Custom Actions

In addition or as an alternative to the actions listed above, service action framework 134 may support tenant-specific and/or custom actions. A tenant-specific action in this context refers to an operation or a set of operations that are unique or targeted to a specific tenant. As an example a script may be defined to configure a software target according to tenant-specific preferences. For instance, tenant A may have specific settings that are defined for an instance of a DBaaS that are different from other tenants of the DBaaS. A cloud administrator may run the action on cloud targets that are available to tenant A in order to configure the settings according the tenant's preference.

Tenant-specific and/or tenant-generic actions may be custom, user-defined instructions in accordance with one or more embodiments. For example, a cloud administrator may define a custom cloud configuration script to initialize new targets as they are brought online. User-defined scripts and other custom action definitions may be registered with service action framework 134 to extend the functionality of the action provided natively by cloud management services 130. Once registered, the custom actions may be presented as an available action to one or more administrators. Thus, the cloud administrators may use the streamlined interface described above to select custom actions to aggregated cloud targets.

FIG. 14 depicts an example set of operations for registering and execution custom action in accordance with one or more embodiments. Service action framework 134 receives a definition of a custom action comprising executable instructions for performing a set of one or more operations for a cloud service; (Operation 1402). For example, service action framework may receive a custom script, executable program, or some other code that defines the action.

Responsive to receiving the custom action definition, service action framework registers the definition of the custom action with a graphical user interface object (Operation 1404). In one or more embodiments, registering the custom action comprises adding a name or identifier of the custom action to a GUI object, such as a drop-down menu or display panel.

Once registered, service action framework 134 may access and present, through the GUI object, an option to perform the custom action on one or more cloud targets, for which are graphical representation is concurrently displayed (Operation 1406). For example, the GUI object may be a drop-down menu comprising a list of actions available to be executed on the one or more cloud targets, where the custom action is included in the list of actions. A display panel may concurrently display, with the drop-down menu, a list of cloud targets that satisfy a set of filter criteria as previously described.

Service action framework 134 may then receive, through the GUI object, selection of the custom action (Operation 1408). For example, a user may click on or otherwise select the name of the custom action from a drop-down menu that lists available actions to perform on cloud targets available to one or more tenants.

Responsive to a user selecting the custom action from the GUI object, service action framework 134 performs the custom action on one or more cloud targets (1410). In the context of a custom configuration script, for example, the custom action may be performed by executing the script on each of the one or more cloud targets.

Figure 15:
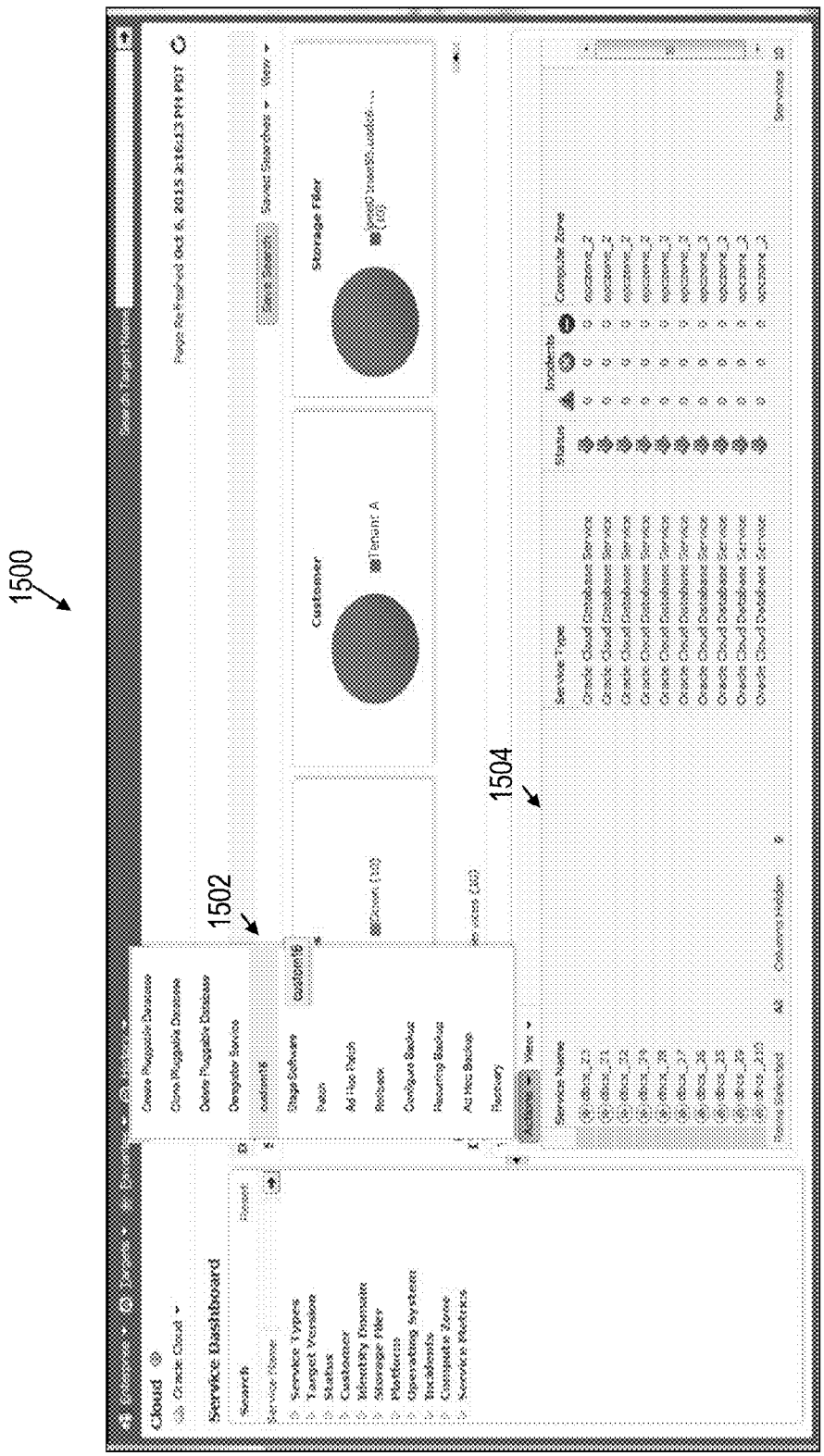
FIG. 15 illustrates an example interface including a registered custom action that may be executed against a set of aggregated cloud targets in accordance with one or more embodiments.

FIG. 15 depicts example interface 1500, which includes a registered custom action that may be executed against a set of aggregated cloud targets. The action appears in drop-down menu 1502 with the name "custom16" (which may be chosen/selected by an administrator or automatically selected). Upon selecting the custom action, the set of executable instructions registered with interface 1500 are executed on the selected cloud target service instances. In the context of a custom configuration script, for example, the script may be run on one or more of the service instances listed in display panel 1504.

In one or more embodiments, custom actions that have been registered with service action framework 134 may be published within the cloud environment. Published scripts may appear in a list of available actions across multiple cloud administrators. For example, if one cloud administrator registers and publishes a cloud configuration scripts, then the custom configuration script may appear in an action drop-down menu or other GUI object in other administrative accounts.

In one or more embodiments, publication may be limited to a subset of cloud administrators based on various attributes associated with the cloud administrators. Example attributes may include, but are not limited to, user roles, identify domains, security clearances and privileges. As an example, a custom script that may be executed on database services may be shared with cloud administrators that are dedicated to maintaining instances of a DBaaS. The custom script may not be accessible to cloud administrators that are maintaining instances of an SaaS or some other level of service. Similarly, custom scripts published to SaaS administrators may not be made available to administrators in other domains. Thus, publication may be limited to cloud administrators that share a particular set of attributes.

In one or more embodiments, requests to publish a custom action may traverse an administrative hierarchy. As an example, a low level administrator may generate a custom script and submit a publication request to share the custom action with other administrators. A supervisory administrator may review the custom action and determine whether or not to push the custom action to other administrative users in the cloud environment. The supervisory administrator may prevent publication and sharing of the custom action, may share the custom action will all administrative user, or may share the custom action with a subset of users. This helps control the quality of custom scripts that are shared and prevents too many custom actions from cluttering administrative interfaces.

17. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
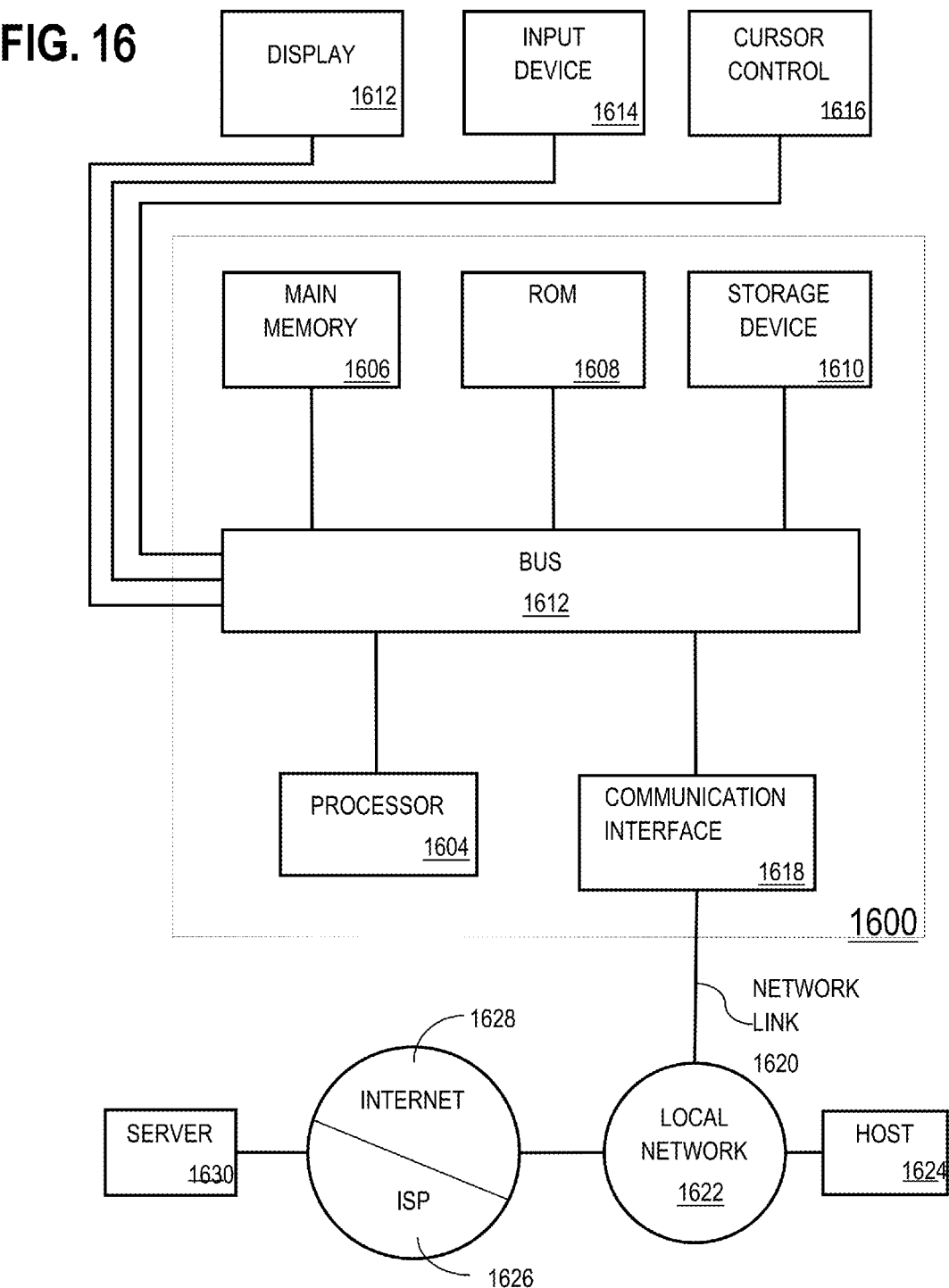
FIG. 16 illustrates an example computer system upon which one or more embodiments may be implemented.

For example, FIG. 16 is a block diagram that illustrates computer system 1600 upon which one or more embodiments may be implemented. Computer system 1600 includes bus 1602 or other communication mechanism for communicating information, and hardware processor 1604 coupled with bus 1602 for processing information. Hardware processor 1604 may be, for example, a general purpose microprocessor.

Computer system 1600 also includes main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes read only memory (ROM) 1608 or other static storage device coupled to bus 1602 for storing static information and instructions for processor 1604. Storage device 1610, such as a magnetic disk or optical disk, is provided and coupled to bus 1602 for storing information and instructions.

Computer system 1600 may be coupled via bus 1602 to display 1612, such as a cathode ray tube (CRT), liquid crystal display (LCD), or light-emitting diode (LED), for displaying information to a computer user. Input device 1614, which may include physical and/or touchscreen based alphanumeric keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to host computer 1624 or to data equipment operated by Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

18. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first selection of at least one attribute for filtering a plurality of instances of a cloud service, wherein each instance of the plurality of instances of the cloud service is accessible by at least one tenant of a plurality of tenants;
   responsive at least to receiving the first selection of the at least one attribute for filtering the plurality of instances of the cloud service:
      aggregating a set of performance data for at least one cloud target in a set of one or more cloud targets that are shared by at least a first instance of the cloud service for a first tenant and second instance of the cloud service for a second tenant;
      wherein the first tenant and the second tenant access the cloud service using different authentication credentials and do not have permission to view the set of performance data for the at least one cloud target;
      wherein the at least one cloud target is causing performance degradation for at least one of the first instance of the cloud service or the second instance of the cloud service;
      presenting, through a display interface, the set of performance data for the at least one cloud target; and
   receiving, through the display interface, a second selection of an action to perform on the at least one cloud target in the set of one or more cloud targets; and
   responsive at least to the second selection, performing the action on the at least one cloud target in the set of one or more cloud targets.

2. The method of claim 1, further comprising presenting, through the display interface, a plurality of actions that are available for the at least one cloud target in the set of one or more cloud targets.

3. The method of claim 2, wherein the plurality of actions that are presented, through the display interface, include at least a first tenant-specific action to perform on cloud targets that support at least the first instance of the cloud service for the first tenant and at least a second tenant-specific action to perform on cloud targets that support at least the second instance of the cloud service for the second tenant.

4. The method of claim 1, wherein the action is performed concurrently on two or more cloud targets responsive at least to the second selection.

5. The method of claim 1, further comprising:
   receiving a service request from the first tenant;
   responsive at least to receiving the service request, presenting, through the display interface, information identifying a set of one or more cloud targets supporting the first instance of the cloud service for the first tenant, wherein the information is not accessible by the first tenant.

6. The method of claim 1, further comprising:
storing a set of one or more dashboard definitions, wherein each respective dashboard definition in the set of one or more dashboard definitions defines at least one attribute for partitioning a plurality of cloud targets;
generating, for each respective dashboard definition in the set of one or more dashboard definitions, at least one respective graphical representation of a set of partitions, wherein cloud targets belonging to a first partition have at least one attribute value for the at least one attribute that is different than cloud targets belonging to a second partition.

7. The method of claim 6, further comprising:
receiving, through the graphical representation of the set of partitions, selection of a particular partition within the set of partitions;
responsive at least to receiving the selection of the particular partition within the graphical representation of the set of partitions, presenting, through the display interface, a set of one or more cloud targets that belong to the selected partition.

8. The method of claim 1, further comprising generating and presenting, through the display interface, a graphical representation of a heat map, the heat map indicating a level of usage for multiple cloud targets supporting a plurality of instances of the cloud service for the plurality of tenants.

9. The method of claim 1, wherein the selected action is at least one of restarting a target host machine supporting one or more instances of the cloud service, performing a patching operation on at least one software resource supporting one or more instances of the cloud service, migrating at least one software resource supporting one or more instances of the cloud service to a different host machine, or performing a custom tenant-specific set of one or more operations.

10. One or more non-transitory computer-readable media storing instructions, which, when executed by one or more hardware processors, cause:
receiving a first selection of at least one attribute for filtering a plurality of instances of a cloud service, wherein each instance of the plurality of instances of the cloud service is accessible by at least one tenant of a plurality of tenants;
responsive at least to receiving the first selection of the at least one attribute for filtering the plurality of instances of the cloud service:
aggregating a set of performance data for at least one cloud target in a set of one or more cloud targets that are shared by at least a first instance of a cloud service for a first tenant and second instance of the cloud service for a second tenant;
wherein the first tenant and the second tenant access the cloud service using different authentication credentials and do not have permission to view the set of performance data for the at least one cloud target;
wherein the at least one cloud target is causing performance degradation for at least one of the first instance of the cloud service or the second instance of the cloud service;
presenting, through a display interface, the set of performance data for the at least one cloud target; and
receiving, through the display interface, a second selection of an action to perform on the at least one cloud target in the set of one or more cloud targets; and
responsive at least to the second selection, performing the action on the at least one cloud target in the set of one or more cloud targets.

11. The one or more non-transitory computer-readable media of claim 10, wherein the instructions further cause presenting, through the display interface, a plurality of actions that are available for the at least one cloud target in the set of one or more cloud targets.

12. The one or more non-transitory computer-readable media of claim 11, wherein the plurality of actions that are presented, through the display interface, include at least a first tenant-specific action to perform on cloud targets that support at least the first instance of the cloud service for the first tenant and at least a second tenant-specific action to perform on cloud targets that support at least the second instance of the cloud service for the second tenant.

13. The one or more non-transitory computer-readable media of claim 10, wherein the action is performed concurrently on two or more cloud targets responsive at least to the second selection.

14. The one or more non-transitory computer-readable media of claim 10, wherein the instructions further cause:
receiving a service request from the first tenant;
responsive at least to receiving the service request, presenting, through the display interface, information identifying a set of one or more cloud targets supporting the first instance of the cloud service for the first tenant, wherein the information is not accessible by the first tenant.

15. The one or more non-transitory computer-readable media of claim 10, wherein the instructions further cause:
storing a set of one or more dashboard definitions, wherein each respective dashboard definition in the set of one or more dashboard definitions defines at least one attribute for partitioning a plurality of cloud targets;
generating, for each respective dashboard definition in the set of one or more dashboard definitions, at least one respective graphical representation of a set of partitions, wherein cloud targets belonging to a first partition have at least one attribute value for the at least one attribute that is different than cloud targets belonging to a second partition.

16. The one or more non-transitory computer-readable media of claim 15, wherein the instructions further cause:
receiving, through the graphical representation of the set of partitions, selection of a particular partition within the set of partitions;
responsive at least to receiving the selection of the particular partition within the graphical representation of the set of partitions, presenting, through the display interface, a set of one or more cloud targets that belong to the selected partition.

17. The one or more non-transitory computer-readable media of claim 10, wherein the instructions further cause:
generating and presenting, through the display interface, a graphical representation of a heat map, the heat map indicating a level of usage for multiple cloud targets supporting a plurality of instances of the cloud service for the plurality of tenants.

18. The one or more non-transitory computer-readable media of claim 10, wherein the selected action is at least one of restarting a target host machine supporting one or more instances of the cloud service, performing a patching operation on at least one software resource supporting one or more instances of the cloud service, migrating at least one software resource supporting one or more instances of the cloud service to a different host machine, or performing a custom tenant-specific set of one or more operations.

19. A system comprising:
one or more hardware processors;
one or more non-transitory computer-readable media storing instructions which, when executed by the one or more hardware processors, cause operations comprising:
receiving a first selection of at least one attribute for filtering a plurality of instances of a cloud service, wherein each instance of the plurality of instances of the cloud service is accessible by at least one tenant of a plurality of tenants;
responsive at least to receiving the first selection of the at least one attribute for filtering the plurality of instances of the cloud service:
aggregating a set of performance data for at least one cloud target in a set of one or more cloud targets that are shared by at least a first instance of a cloud service for a first tenant and a second instance of the cloud service for a second tenant;
wherein the first tenant and the second tenant access the cloud service using different authentication credentials and do not have permission to view the set of performance data for the at least one cloud target;
wherein the at least one cloud target is causing performance degradation for at least one of the first instance of the cloud service or the second instance of the cloud service;
presenting, through a display interface, the set of performance data for the at least one cloud target; and
receiving, through the display interface, a second selection of an action to perform on the at least one cloud target in the set of one or more cloud targets; and
responsive at least to the second selection, performing the action on the at least one cloud target in the set of one or more cloud targets.

* * * * *

UNITED STATES PATENT AND TRADEMARK OFFICE
CERTIFICATE OF CORRECTION

PATENT NO. : 10,491,689 B2
APPLICATION NO. : 15/387045
DATED : November 26, 2019
INVENTOR(S) : Kuchibhotla et al.

Page 1 of 1

It is certified that error appears in the above-identified patent and that said Letters Patent is hereby corrected as shown below:

In the Specification

In Column 2, Line 43, after "operation" insert -- ; --.

In Column 2, Line 61, after "embodiments" insert -- ; --.

In Column 7, Line 60, after "targets" insert -- . --.

In Column 13, Line 50, delete "''x''" and insert -- 'x' --, therefor.

In Column 27, Line 54, after "actions" insert -- . --.

In Column 28, Line 8, delete "that" and insert -- than --, therefor.

In Column 29, Line 45, after "applied)" insert -- . --.

In Column 29, Line 48, delete "target;" and insert -- target. --, therefor.

In the Claims

In Column 34, Line 32, in Claim 1, after "and" insert -- a --.

In Column 35, Line 56, in Claim 10, after "and" insert -- a --.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*